United States Patent
Chandramouli et al.

(10) Patent No.: US 9,697,262 B2
(45) Date of Patent: Jul. 4, 2017

(54) ANALYTICAL DATA PROCESSING ENGINE

(71) Applicant: Microsoft Corporation, Redmond, WA (US)

(72) Inventors: Badrish Chandramouli, Redmond, WA (US); John Wernsing, Redmond, WA (US); Jonathan D. Goldstein, Bellevue, WA (US); Michael Barnett, Seattle, WA (US); John C. Platt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 14/109,643

(22) Filed: Dec. 17, 2013

(65) Prior Publication Data

US 2015/0169683 A1 Jun. 18, 2015

(51) Int. Cl.
*G06F 17/30* (2006.01)
(52) U.S. Cl.
CPC .............................. *G06F 17/30551* (2013.01)
(58) Field of Classification Search
None
See application file for complete search history.

(56) References Cited

U.S. PATENT DOCUMENTS

| 6,446,136 B1* | 9/2002 | Pohlmann | G06F 11/3006 707/999.104 |
| 7,996,388 B2 | 8/2011 | Jain et al. | |
| 8,478,743 B2 | 7/2013 | Chandramouli et al. | |
| 8,484,243 B2 | 7/2013 | Krishnamurthy et al. | |
| 8,694,565 B2 | 4/2014 | Beckman et al. | |
| 8,990,416 B2 | 3/2015 | Shukla et al. | |
| 2009/0125635 A1* | 5/2009 | Barga | G06F 11/0793 709/231 |
| 2009/0171890 A1* | 7/2009 | Johnson | G06F 17/30516 |
| 2011/0231389 A1 | 9/2011 | Surna et al. | |
| 2011/0282812 A1* | 11/2011 | Chandramouli | G06F 17/30522 706/12 |
| 2012/0166417 A1* | 6/2012 | Chandramouli et al. | 707/713 |
| 2013/0031567 A1 | 1/2013 | Nano et al. | |
| 2013/0066924 A1 | 3/2013 | Iyer et al. | |

(Continued)

FOREIGN PATENT DOCUMENTS

WO  WO2011162628 A2  12/2011

OTHER PUBLICATIONS

Badrish, et al., "Scalable Progressive Analytics on Big Data in the Cloud" In Proceedings of the VLDB Endowment, vol. 6, No. 14, Aug. 26, 2013, 12 pages.

(Continued)

*Primary Examiner* — Hung Q Pham
(74) *Attorney, Agent, or Firm* — Lee & Hayes, PLLC

(57) ABSTRACT

Some examples include high-performance query processing of real-time and offline temporal-relational data. Further, some implementations include processing streaming data events by annotating individual events with a first timestamp (e.g., a "sync-time") and second timestamp that may identify additional event information. The stream of incoming data events may be organized into a sequence of data batches that each include multiple data events. The individual data batches in the sequence may be processed in a non-decreasing "sync-time" order.

20 Claims, 11 Drawing Sheets

(56) References Cited

U.S. PATENT DOCUMENTS

| | | |
|---|---|---|
| 2013/0159969 A1 | 6/2013 | Meijer et al. |
| 2013/0204896 A1 | 8/2013 | Jimenez Peris et al. |
| 2013/0254771 A1 | 9/2013 | Musayev et al. |
| 2014/0095447 A1 | 4/2014 | Deshmukh et al. |
| 2014/0372438 A1 | 12/2014 | Chandramouli et al. |
| 2016/0004751 A1 | 1/2016 | Lafuente Alvarez et al. |

OTHER PUBLICATIONS

Barga, et al., "Consistent Streaming through Time: A Vision for Event Stream Processing", In Proceedings of 3rd Biennial Conference on Innovative Data Systems Research, Jan. 7, 2007, 12 pages.
Barnett, et al.,"Stat!—An Interactive Analytics Environment for Big Data" In Proceedings of the ACM SIGMOD International Conference on Management of Data, Jun. 22, 2013, 4 pages.
Chandramouli, et al., "Temporal Analytics on Big Data for Web Advertising" In Proceedings of the 2012 IEEE 28th International Conference on Data Engineering, Apr. 1, 2012, 12 pages.
"Column Store Features", Published on: May 9, 2011, Available at: http://www.monetdb.org/Home/Features.
Gulisano, et al., "StreamCloud: A Large Scale Data Streaming System" In Proceedings of International Conference on Distributed Computing System, Jun. 21, 2010, 12 pages.
Hilley, et al., "Persistent Temporal Streams" in Proceedings of the 10th ACM/IFIP/USENIX International Conference on Middleware, Nov. 30, 2009, 20 pages.
"In-Stream Big Data Processing", Published on: Aug. 20, 2013, Available at: http://highlyscalable.wordpress.com/2013/08/20/in-stream-big-data-processing/#comments, 23 pages.
Liarou, et al., "A Column-Oriented Data Stream Engine", Retrieved on: Oct. 17, 2013, Available at:http://citeseerx.ist.psu.edu/viewdoc/download?doi=10.1.1.108.9843& rep=rep1&type=pdf, 9 pages.
Tucker, et al., "Exploiting Punctuation Semantics in Continuous Data Streams", In IEEE Transactions on Knowledge and Data Engineering, vol. 15, Issue 3, May 2003, 14 pages.
Zaharia, et al., "Discretized Streams: An Effcient and Fault-Tolerant Model for Stream Processing on Large Cluster" In Proceedings of the 4th USENIX conference on Hot Topics in Cloud Computing, Jun. 12, 2012, 6 pages.
Abadi, et al., "The Design of the Borealis Stream Processing Engine", In Proceedings of the Conference on Innovative, Data Systems Research, Jan. 4, 2005, 13 pages.
Akidau, et al, "MillWheel: Fault-Tolerant Stream Processing at Internet Scale", In Proceedings of the VLDB Endowment, vol. 6, Issue 11, Aug. 2013, pp. 1033-1044.
Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, Issue 12, Aug. 2015, pp. 1792-1803.
Alexandrov, et al., "The Stratosphere Platform for Big Data Analytics", In International Journal on Very Large Data Bases, vol. 23, Issue 6, Dec. 2014, pp. 939-964.
Ali, et al., "Spatio-Temporal Stream Processing in Microsoft StreamInsight", In Proceedings of IEEE Data Engineering Bulletin, vol. 33, No. 2, Jun. 2010, pp. 1-6.
"Apache Hadoop NextGen MapReduce (YARN)", Retrieved on: Jan. 12, 2016 Available at: http://hadoop.apache.org/docs/current/hadoop-yarn/hadoop-yarn-site/YARN.html, 2 pages.
"Apache Storm", Retrieved on: Jan. 12, 2016; Available at: http://storm.apache.org/, 4 pages.
Armbrust, Michael Paul, "Scale-Independent Relational Query Processing", In Technical Report No. UCB/EECS-2013-165, Oct. 4, 2013, 144 pages.
Armbrust, et al., "Spark SQL: Relational Data Processing in Spark", In Proceedings of the ACM SIGMOD International Conference on Management of Data, May 31, 2015, pp. 1383-1394.

Babcock, et al., "Models and Issues in Data Stream Systems", In Proceedings of the twenty-first ACM SIGMOD-SIGACT-SIGART symposium on Principles of database systems, Jun. 3, 2002, pp. 1-16.
Barnett, et al., "Stat! An Interactive Analytics Environment for Big Data", In Proceedings of ACM SIGMOD International Conference on Management of Data, Jun. 22, 2013, pp. 1013-1016.
"BigQuery", Retrieved on: Jan. 12, 2016; Available at: https://cloud.google.com/bigquery/, 4 pages.
Chambers, et al., "FlumeJava: Easy, Efficient Data-Parallel Pipelines", In Proceedings of the 31st ACM SIGPLAN conference on Programming Language Design and Implementation, Jun. 5, 2010, pp. 363-375.
Chandramouli, et al., "Scalable Progressive Analytics on Big Data in the Cloud", In Proceedings of International Conference on Very Large Data Bases, vol. 6, Issue 14, Aug. 26, 2013, pp. 1726-1737.
Chandramouli, et al., "The Trill Incremental Analytics Engine", In Microsoft Research Technical Report MSR-TR-2014-54, Apr. 2014, 14 pages.
Chandramouli, et al., "Trill: A High-Performance Incremental Query Processor for Diverse Analytics", In Proceedings of the VLDB Endowment, vol. 8, Issue 4, Dec. 2014, pp. 401-412.
Dean, et al., "MapReduce: Simplified Data Processing on Large Clusters", In Journal of Communications of the ACM Magazine, vol. 51, Issue 1, Jan. 2008, pp. 107-113.
"Expression Trees (C# and Visual Basic)", Retrieved on: Jan. 12, 2016 Available at: https://msdn.microsoft.com/en-us/library/bb397951.aspx, 4 pages.
Fernandez, et al., "Integrating Scale Out and Fault Tolerance in Stream Processing using Operator State Management", In Proceedings of ACM SIGMOD International Conference on Management of Data, Jun. 22, 2013, pp. 725-736.
"GitHub Archive", Retrieved on: Jan. 12, 2016; Available at: https://www.githubarchive.org/, 3 pages.
Grover, et al., "SQL-like Big Data Environments: Case Study in Clinical Trial Analytics", In Proceedings of IEEE International Congress on Big Data, Oct. 29, 2015, pp. 2680-2689.
Gupta, et al., "Amazon Redshift and the Case for Simpler Data Warehouses", In Proceedings of ACM SIGMOD International Conference on Management of Data, May 31, 2015, pp. 1917-1923.
Hugg, John, "Lambda Complexity: Why Fast Data Needs New Thinking", Published on: Mar. 17, 2015 Available at: https://voltdb.com/blog/lambda-complexity-why-fast-data-needs-new-thinking, 14 pages.
Isard, et al., "Dryad: Distributed Data-Parallel Programs from Sequential Building Blocks", In Proceedings of 2nd ACM SIGOPS/EuroSys European Conference on Computer Systems, Mar. 21, 2007, pp. 59-72.
Jensen, et al., "Temporal Data Management", In Journal of IEEE Transactions on Knowledge and Data Engineering, vol. 11, Issue 1, Jan. 1999, pp. 36-44.
Kornacker, et al., "Impala: A Modern, Open-Source SQL Engine for Hadoop", In Proceedings of 7th Biennial Conference on Innovative Data Systems Research, Jan. 4, 2015, 10 pages.
Leetaru, Kalev H., "World's Largest Event Dataset Now Publicly Available in BigQuery", Published on: May 29, 2014, Available at: http://googlecloudplatform.blogspot.in/2014/05/worlds-largest-event-dataset-now-publicly-available-in-google-bigquery.html; 5 pages.
Li, et al., "No Pane, No Gain: Efficient Evaluation of Sliding-Window Aggregates over Data Streams", In Journal of ACM SIGMOD Record, vol. 34, Issue 1, Mar. 2005, pp. 39-44.
"LINQ (Language-Integrated Query)", Retrieved on: Jan. 12, 2016 Available at: https://msdn.microsoft.com/en-us/library/bb397926.aspx, 2 pages.
Marz, Nathan, "How to beat the CAP Theorem", Published on: Oct. 13, 2011 Available at: http://nathanmarz.com/blog/how-to-beat-the-cap-theorem.html, 10 pages.
"Microsoft Azure", Retrieved on: Jan. 12, 2016; Available at: https://azure.microsoft.com/en-us/, 7 Pages.
Murray, et al., "Naiad: A Timely Dataflow System", In Proceedings of the Twenty-Fourth ACM Symposium on Operating Systems Principles, Nov. 3, 2013, pp. 439-455.

(56) References Cited

OTHER PUBLICATIONS

Okcan, et al., "Processing Theta-Joins using MapReduce", In Proceedings of the ACM SIGMOD International Conference on Management of data, Jun. 12, 2011, pp. 949-960.
Pavlo, et al., "A comparison of approaches to large-scale data analysis", In Proceedings of the ACM SIGMOD International Conference on Management of data, Jun. 29, 2009, pp. 165-178.
Stonebraker, et al., "C-store: A Column-oriented DBMS", In Proceedings of the 31st international conference on Very large data bases, Aug. 30, 2005, pp. 553-564.
Thusoo, et al., "Hive—A Warehousing Solution Over a Map-Reduce Framework", In Proceedings of the VLDB Endowment, vol. 2, Issue 2, Aug. 24, 2009, pp. 1626-1629.
Xin, et al., "Shark: SQL and Rich Analytics at Scale", In Proceedings of the ACM SIGMOD International Conference on Management of Data, Jun. 22, 2013, pp. 13-24.
Yu, et al., "DryadLINQ: a System for General-Purpose Distributed Data-Parallel Computing using a High-Level Language", In Proceedings of the 8th USENIX conference on Operating systems design and implementation, Dec. 8, 2008, pp. 1-12.
Zaharia, et al., "Resilient Distributed Datasets: A Fault-Tolerant Abstraction for In-Memory Cluster Computing", In Proceedings of the 9th USENIX conference on Networked Systems Design and Implementation, Apr. 25, 2012, 14 pages.
Zhang, et al., "Lightweight Distributed Execution Engine for Large-Scale Spatial Join Query Processing", In Proceedings of IEEE International Congress on Big Data, Jun. 27, 2015, 8 pages.
Ali, et al., "The Extensibility Framework in Microsoft StreamInsight", In Proceedings of the IEEE 27th International Conference on Data Engineering, Apr. 11, 2011, 12 pages.
Anicic, et al., "EP-SPARQL: A Unified Language for Event Processing and Stream Reasoning", In Proceedings of the 20th international conference on World wide web, Mar. 28, 2011, pp. 635-644.
Arasu, et al., "Stream: The Stanford Data Stream Management System", In Technical Report, Mar. 2004, pp. 1-21.
Barga, et al., "Consistent streaming through time: A Vision for Event Stream Processing", In Proceedings of 3rd Biennial Conference on Innovative Data Systems Research, Jan. 7, 2007, pp. 363-374.
Boncz, et al., "MonetDB/XQuery: A Fast XQuery Processor Powered by a Relational Engine", In Proceedings of the 2006 ACM SIGMOD international conference on Management of data, Jun. 27, 2006, pp. 479-490.
Bonnet, et al., "Towards Sensor Database Systems", In Proceedings of the Second International Conference on Mobile Data Management, Jan. 8, 2001, 12 pages.
Brown, Paul G., "Overview of sciDB: Large scale array storage, processing and analysis", In Proceedings of ACM SIGMOD International Conference on Management of data, Jun. 6, 2010, pp. 963-968.
Chandrasekaran, et al., "TelegraphCQ: continuous dataflow processing", In Proceedings of the ACM SIGMOD international conference on Management of data, Jun. 9, 2003, pp. 668.
Chong, et al., "Sensor Networks: Evolution, Opportunities, and Challenges", In Proceedings of the IEEE, vol. 91, Issue 8, Aug. 2003, pp. 1247-1256.
Cranor, et al., "Gigascope: A Stream Database for Network applications", In Proceedings of the ACM SIGMOD International conference on Management of data, Jun. 9, 2003, pp. 647-651.
Gedik, et al., "SPADE: The System S Declarative Stream Processing Engine", In Proceedings of the ACM SIGMOD International conference on Management of data, Jun. 9, 2008, pp. 1123-1134.
Girod, et al., "The Case for a Signal-Oriented Data Stream Management System", In Proceedings of 3rd Biennial Conference on Innovative Data Systems Research, Jan. 7, 2007, 10 pages.
Girod, et al., "XStream: A Signal-oriented Data Stream Management System", In Proceedings of IEEE 24th International Conference on Data Engineering, Apr. 7, 2008, pp. 1180-1189.
Hammad, et al., "Nile: A Query Processing Engine for Data Streams", In Proceedings of 20th International Conference on Data Engineering, Mar. 30, 2004, 1 page.
Jensen, et al., "Temporal specialization", In Proceedings of the Eighth International Conference on Data Engineering, Feb. 3, 1992, pp. 594-603.
Lander, et al., "Appion: an integrated, database-driven pipeline to facilitate EM image processing", In Journal of structural biology vol. 166, No. 1, Apr. 2009, pp. 1-16.
Madden, et al., "TinyDB: An Acquisitional Query Processing System for Sensor Networks", In Journal of ACM Transactions on Database Systems, vol. 30, Issue 1, Mar. 2005, pp. 1-47.
Maier, et al., "Semantics of data streams and operators", In Proceedings of the 10th international conference on Database Theory, Jan. 5, 2005, pp. 37-52.
Stonebraker, et al., "Requirements for Science Data Bases and SciDB", In Proceedings of Fourth Biennial Conference on Innovative Data Systems Research, Jan. 4, 2009, 9 pages.
Sullivan, et al., "Tribeca: A System for Managing Large Databases of Network Traffic", In Proceedings of the USENIX Annual Technical Conference, Jun. 1998, 13 pages.
Zhou, et al., "Unifying the Processing of XML Streams and Relational Data Streams", In Proceedings of the 22nd International Conference on Data Engineering, Apr. 3, 2006, pp. 1-12.

* cited by examiner

700 ⤴

IN SYNC-TIME ORDER, PROCESS ALL INPUT EVENTS AND INSERT INTO A MAP DATA STRUCTURE WITH A KEY EQUAL TO A MAPPING KEY OF THE INPUT EVENT AND A VALUE EQUAL TO A PAYLOAD OF THE INPUT EVENT
702

SEARCH THE MAP DATA STRUCTURE FOR AN ALTERNATE INPUT TO IDENTIFY EVENTS THAT ARE RECEIVED WITH THE SAME MAPPING KEY FROM THE ALTERNATE INPUT
704

GENERATE AN OUTPUT FOR PAYLOAD(S) IDENTIFIED WITH THE SAME MAPPING KEY CORRESPONDING TO A SUCCESSFUL JOIN
706

EMPLOY TWO MAP DATA STRUCTURES AND AN ECQ TO REMOVE EVENTS/INTERVALS ONCE TIME PROGRESSES TO AN INTERVAL'S ENDING TIMESTAMP OR AN END EDGE
802

SEARCH THE MAP DATA STRUCTURE OF AN ALTERNATE INPUT TO IDENTIFY PAYLOADS WHICH WERE JOINED PREVIOUSLY
804

GENERATE A CORRESPONDING END EDGE FOR IDENTIFIED PAYLOAD(S)
806

FIG. 8

ANALYTICAL DATA PROCESSING ENGINE

BACKGROUND

Data analytics platforms may analyze large amounts of data in order to derive insights from the data. In some cases, efficient analysis of such large amounts of data may be difficult to perform in a cost-effective manner. Further, one set of technologies may be employed in the context of streaming data analytics while another set of technologies may be employed in the context of offline data analytics.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for high-performance query processing of real-time and offline temporal-relational data. In some cases, a stream of incoming data events may be received, and each individual data event may be annotated with a first timestamp (e.g., a "SyncTime") and a second timestamp (e.g., an "OtherTime"). The first timestamp may identify when a particular data event in the stream of incoming data events is received, and the second timestamp may identify additional information associated with the particular data event.

To illustrate, in some implementations, SyncTime may denote the logical instant when a fact becomes known to the system. In the case of an interval [Vs, Ve], the event may arrive as a start-edge at timestamp Vs and an end-edge at timestamp Ve. Hence, SyncTime for the start-edge and end-edge may be set to Vs and Ve, respectively. In the case of an interval, OtherTime may provide some a priori knowledge of the future (i.e., that the event is known to end at some future time Ve). In the case of an end-edge, OtherTime may provide additional context to the event (i.e., the start time that the event is originally associated with).

In some implementations, the stream of incoming data events may be organized into a sequence of data batches that each include multiple data events. Processing of the individual data batches in the sequence may occur in a non-decreasing SyncTime order.

In some cases, representing timestamps as SyncTime and OtherTime may have several advantages. For example, both interval and edge events may be represented using two timestamp fields instead of three, thereby reducing the space overhead of events and reducing memory bandwidth usage during query processing. Further, because data is processed in SyncTime order, SyncTime may be frequently used in operator algorithms. By explicitly identifying the SyncTime rather than computing on-demand, performance benefits may be achieved.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

FIGS. 7 and 8 illustrate example process flows for performing temporal join operations, according to some implementations.

DETAILED DESCRIPTION

Figure 1:
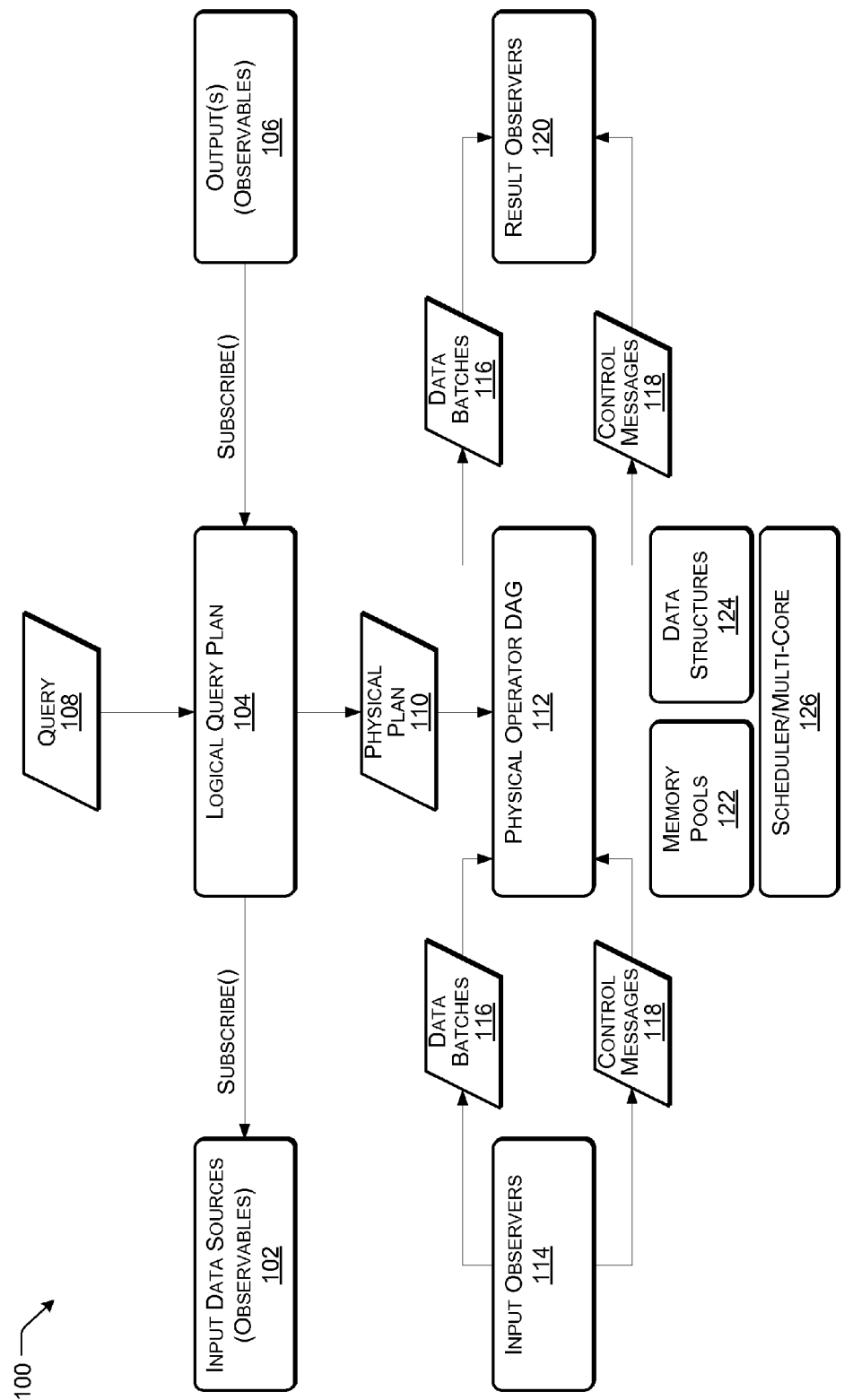
FIG. 1 illustrates an example of a framework for query processing according to some implementations.

The present disclosure relates to a query processing engine for real time and offline temporal-relational data. In some embodiments, the query processing engine may be used as a streaming temporal analytics engine (referred to herein as a "streaming engine") for high-performance processing of streaming data (e.g., with query processing speeds on the order of a trillion events per day in some cases). The streaming engine of the present disclosure utilizes a logical temporal model with particular design choices and restrictions at the physical level that may significantly increase the efficiency of the engine (e.g., by a factor of 100 to 1000) compared to existing streaming engines. Further, the temporal and data model of the present disclosure may be used for a diverse set of data analytics, including offline relational-style queries, real-time temporal queries and progressive queries.

In the present disclosure, each tuple in the system has two associated logical timestamps to denote when the tuple enters computation and when the tuple leaves computation. Users can express a query "Q" over the timestamped data. Logically, the dataset may be divided into snapshots that are formed by the union of unique interval endpoints of all events in the system. The query Q is logically executed over every snapshot. A result is present in the output at timestamp "T" if it is the result of Q applied to data that is "alive at" (whose intervals are stabbed by) T. This logical model of streams may be referred to as the CEDR model ("Complex Event Detection and Response").

The present disclosure describes using particular design choices and restrictions in the physical model in order to get high performance with the CEDR logical temporal model. For example, in the present disclosure, physical data events are annotated with two timestamps, a "SyncTime" timestamp and an "OtherTime" timestamp. In some implementations, both timestamps may be represented as long values (e.g., as 8-byte integers). A logical event with (logical) lifetime [Vs, Ve] may physically appear in two forms. In the first form, the logical event may physically appear as an interval event with a SyncTime of Vs and an OtherTime of Ve. In the second form, the logical event may physically appear in the form of two events: a start-edge event and an end-edge event. In this case, the start-edge event provides the start time and has a SyncTime of Vs and an OtherTime of ∞. The end-edge event has a SyncTime of Ve and an OtherTime of Vs. This type of logical event is different from an interval event because an interval event has an OtherTime that is not smaller than the SyncTime. That is, the three different kinds of events (interval, start, and end) can be distinguished by a computation on the two timestamps, without additional storage. Further, there may be a start-edge event that has no matching end-edge event. This represents data that enters the system and never expires.

Thus, the SyncTime timestamp represents the logical instant when information becomes known to the system. In the case of an interval [Vs, Ve], the information arrives as a start-edge at timestamp Vs and an end-edge at timestamp Ve. Hence, in the case of an interval event, the SyncTime for the start-edge is set to Vs and the SyncTime for the end-edge is set to Ve. The timestamp OtherTime represents additional information. In case of an interval, the OtherTime timestamp provides some a priori knowledge of the future (i.e., that the event is known to end at some future time Ve). In case of an end-edge, the OtherTime timestamp provides additional context to the event (i.e., the start time that the event is originally associated with).

In the present disclosure, incoming data streams are grouped. In other words, for every payload there exists a key that identifies a logical substream within the original stream. Keys (and their hash values) are materialized as part of events to avoid the expense associated with re-computation.

The present disclosure constrains data to be ingested and processed in non-decreasing SyncTime order. In other words, each operator processes and produces tuples in this non-decreasing SyncTime order. The data constraints result in various operator algorithm optimizations described further below. Further, representing timestamps as SyncTime and OtherTime has several advantages. For example, both interval and edge events may be represented using two timestamp fields instead of three timestamps, resulting in a reduction of the space overhead of events and a reduction in memory bandwidth usage during query processing. As such, having the SyncTime explicit rather than being computed on-demand may provide further performance benefits.

Given that data is timestamped and exists in SyncTime order, every event essentially also represents a punctuation in terms of guaranteeing that future events will not have a lower sync-time. However, in the system of the present disclosure, explicit punctuations may still be used for several purposes. As one example, a punctuation may indicate the passage of time in case there are lulls in the input (i.e., periods where there is no incoming data). As another example, the query processing engine may internally batch events before sending the information to a next operator. In this case, punctuations may serve to prompt the system into producing an output, which may involve closing out and pushing partially filled data batches to the next operator. Thus, in the system of the present disclosure, punctuations may expose and exploit the tradeoff between throughput and latency. The system may batch events and process as batches for improved performance. While this may add to latency, the user may issue a punctuation to "kick" the system into flushing partial batches and producing output immediately.

The query processing engine of the present disclosure materializes grouping information as part of events. To illustrate the logical groups of streams, a stream that is grouped by key K logically represents n distinct substreams, one for every distinct value of the grouping key K. An ungrouped stream is represented as a stream grouped by Unit (an empty struct). There is a single timestamp domain across all groups. In other words, passage of time occurs across all groups and does not occur on a per-group basis. The grouping key K and its hash value H are materialized and stored as part of events. In an alternative implementation, the grouping key K and/or hash value H may not be materialized. Instead, the expression to compute the associated values may be cached and the grouping key K and/or hash value H may be computed on-demand.

Further, the present disclosure may provide a "one size fits many" approach to data analytics. That is, the temporal model of the present disclosure may support a wide range of analytics, including not only teal-time temporal queries, but also offline temporal queries, relational (atemporal) queries, and progressive queries. The present disclosure describes a "pay-as-you-go" approach that allows a single streaming engine relying on a general model to be used for each of these diverse use cases without sacrificing performance. In general, the approach adheres to the principles that simple operations may be "very" fast, that one may not pay for temporality unless temporality is necessary for the query, that one may not pay for progressiveness (approximate results) unless it is needed, and that operations may be "very" fast for simple data types, while degrading gracefully as types become complex.

In general, in order to improve query processing performance on a single machine, the amount of data transferred between a main memory subsystem and a central processing unit (CPU) may be minimized. The streaming engine of the present disclosure uses a "bottom-up" or "emergent" architecture and design in order to remove bottlenecks that may be associated with existing streaming engines. Developing the emergent architecture of the present disclosure included initially determining a speed associated with a pass-through query and subsequently adding one operator after another while being careful not to degrade existing performance, in order to avoid any single bottleneck in the system. The result is an architecture that carefully separates out two kinds of work done by a streaming engine. One kind of work is referred to herein as "fine-grained work" and represents work that is done for every event in the system, while the other kind of work is referred to herein as "coarse-grained work" and represents work that is performed infrequently and that may be amortized across multiple events. Separating the two kinds of work allows for a design where the unit of data processing at the engine level is a "message" (i.e., a single unit that can consist of a batch of physical events). The engine of the present disclosure operates over a sequence of messages as input.

In the present disclosure, a query plan is organized as a graph of operators (a directed acyclic graph ("DAG") of operators), with each operator receiving and generating messages. Operators perform fine-grained work in carefully written tight loops that leverage data locality, instruction locality, compiler loop-unrolling, unsafe code, code generation, and other optimizations that are discussed further below. Coarse-grained work is performed by the engine and operators at message boundaries. This course-grained work may include handing off data across cores, allocating messages, and updating memory pools.

Each operator receives a batch, processes events within the batch, and writes output events into an output batch. The output batch is not handed off to a next downstream operator until the batch is full, or a control event (punctuation) is received. This exposes a throughput/latency tradeoff that can be exploited, as described further below.

Example Implementations

FIG. 1 illustrates an example framework 100 for high-performance query data processing according to some implementations.

In FIG. 1, input data sources 102 (for example, as observables) may be used to build a logical query plan 104 that may then be connected to one or more outputs 106 (for example, observables). In some implementations, the query processing engine may include technology (e.g., .NET technology, etc.) that may be available as a library (i.e., no heavy-weight server). This may allow the use of .NET types and expressions in specifying a query 108 for processing. In some cases, the query 108 may be written using LINQ (for "language integrated querying").

During creation of the logical query plan 104, query compile-time work such as property derivation may also be performed. When subscribing to an output 106, a Subscribe( ) call may propagate through the query plan 104, resulting in the construction of a physical plan 110 and associated physical DAG of operators 112 (this includes the creation and instantiation of code-generated operators). Input observers 114 feed content in the form of messages (e.g., via On( ) messages). For example, FIG. 1 illustrates an example of a data batch message 116 and a control message 118 being provided by the input observers 114. This triggers query processing and results in output (e.g., as messages) being pushed to result observers 120 as the output is produced.

As described further below, in some cases, operators may be supported by memory pool management interfaces to memory pools 122 that allow re-use of messages and data structures 124 within the engine in order to reduce the cost of .NET allocation and garbage collection. As described further below, this may also provide fast data structures such as FastDictionary and blocking concurrent queues to enable high performance. In some cases, a scheduler 126 may allow for techniques to effectively scale out computation to multiple cores using a special version of GroupApply (as described below) or using a more general scheduler design for operators.

In the system of the present disclosure, data is organized as a sequence of messages. A message can be of multiple types. For example, a "DataBatch" message (e.g., the message 116 in FIG. 1) may include a bundle of physical data events that are organized for high performance query processing. In the present disclosure, the notion of batches is physical. That is, the output of the query 108 (also called logical result) is unaffected by batching. Rather, physical aspects (such as "when" output is produced) are affected by batching. As another example, a "Punctuation" message (e.g., the control message 118 in FIG. 1) may include a special control event that is associated with a timestamp. As a further example, a "Completed" message (e.g., the control message 118 in FIG. 1) may include a special control event that indicates the end of a stream.

Figure 2:
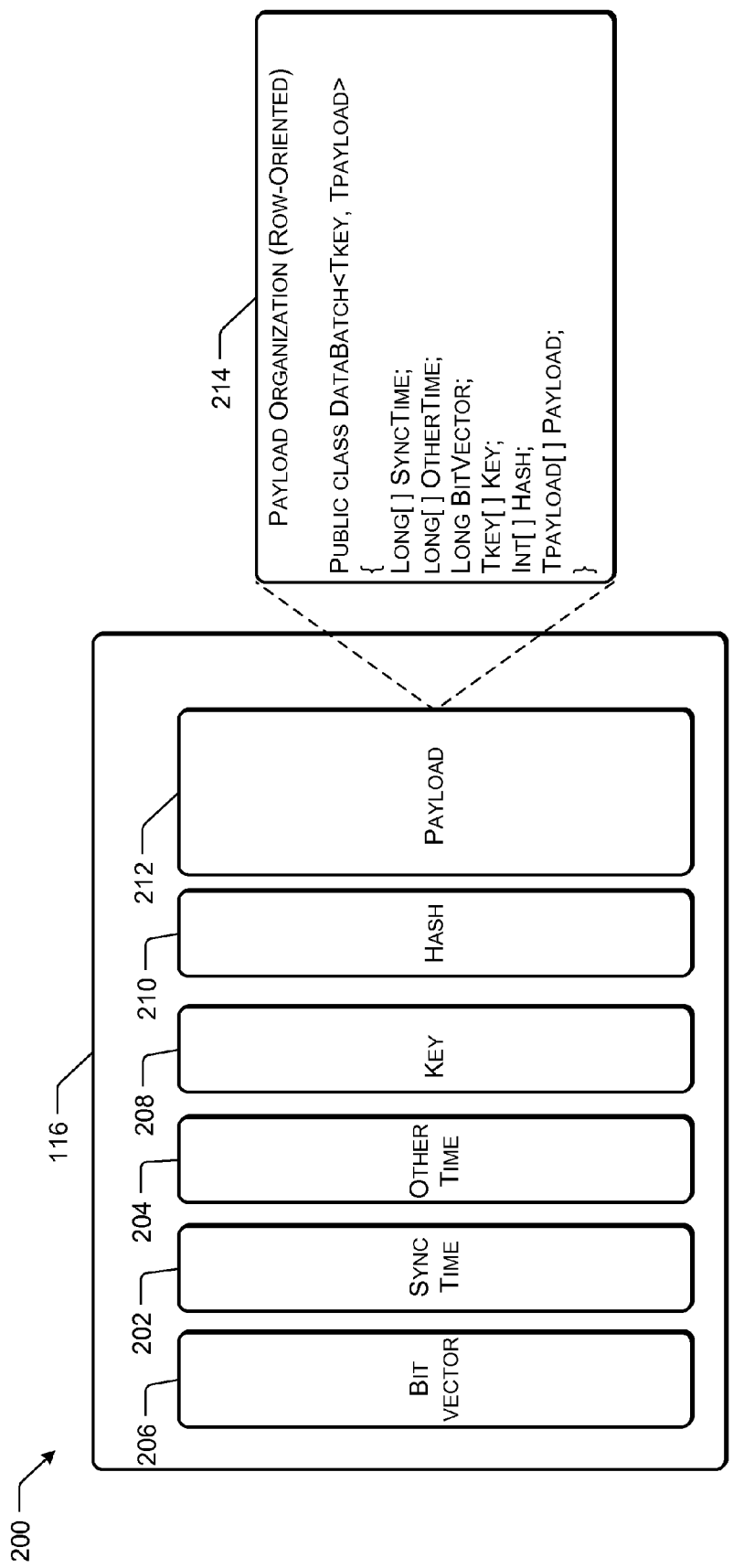
FIG. 2 is a block diagram illustrating an example of data organization within a data batch message, according to some implementations.

Referring to FIG. 2, an example of the organization of data within a DataBatch message (e.g., the DataBatch message 116 of FIG. 1) is illustrated and generally designated 200.

In the system of the present disclosure, the stream of incoming data events (e.g., from the input data sources 102 in FIG. 1) may be organized into a sequence of batches. Each batch may include a large number of data events (e.g., up to "BatchSize" events). Each DataBatch message 116 stores the control parameters in columnar format, as shown in FIG. 2. Each DataBatch message 116 may include multiple arrays, including a SyncTime array 202, an OtherTime array 204, a Bitvector array 206, a Key array 208, a Hash array 210 and a Payload array 212.

The SyncTime array 202 is an array of the SyncTime values of all events in the batch. The OtherTime array 204 is an array of the OtherTime values of all events in the batch. The Bitvector array 206 is an occupancy vector, where the array includes one bit per event. A bit value of 0 may indicate that the corresponding data event exists, while a bit value of 1 may indicate that the event does not exist (is absent). The Bitvector array 206 may allow efficient operator algorithms in some cases by avoiding the unnecessary movement of data to/from main memory. For example, a "Where" operator can apply a predicate, and if the predicate fails, the corresponding bitvector entry in the Bitvector array 206 may be set to 1. The Key array 208 may be an array of the grouping key values of the data events within the DataBatch message 116. Similar to payloads, the grouping keys in DataBatches may also be types with multiple fields. In this case, the key fields may be represented as a set of arrays, one per field in the grouping key. The Hash array 210 is an array of hash values (e.g., 4 byte integers), each associated with a particular key. Keys and their associated hashes may be pre-computed and materialized to avoid the expensive task of the operators computing these values.

The Payload array 212 is an array of all the payloads within the DataBatch message 116. In some implementations, the system of the present disclosure may support arbitrary .NET types as payloads. Further, the system of the present disclosure supports two modes for payloads, a row-oriented mode and a columnar-oriented mode. During query processing, one may switch from the column-oriented mode to the row-oriented mode or vice versa, based on the types and operators in the query plan. In both cases, a user view of data is row-oriented. In other words, users may write queries assuming a row-oriented view of data. In FIG. 2, an example payload organization 214 illustrates that, in a row-oriented mode, the payload 212 is simply an array of "TPayload" (i.e., the type of the payload 212).

Figure 3:
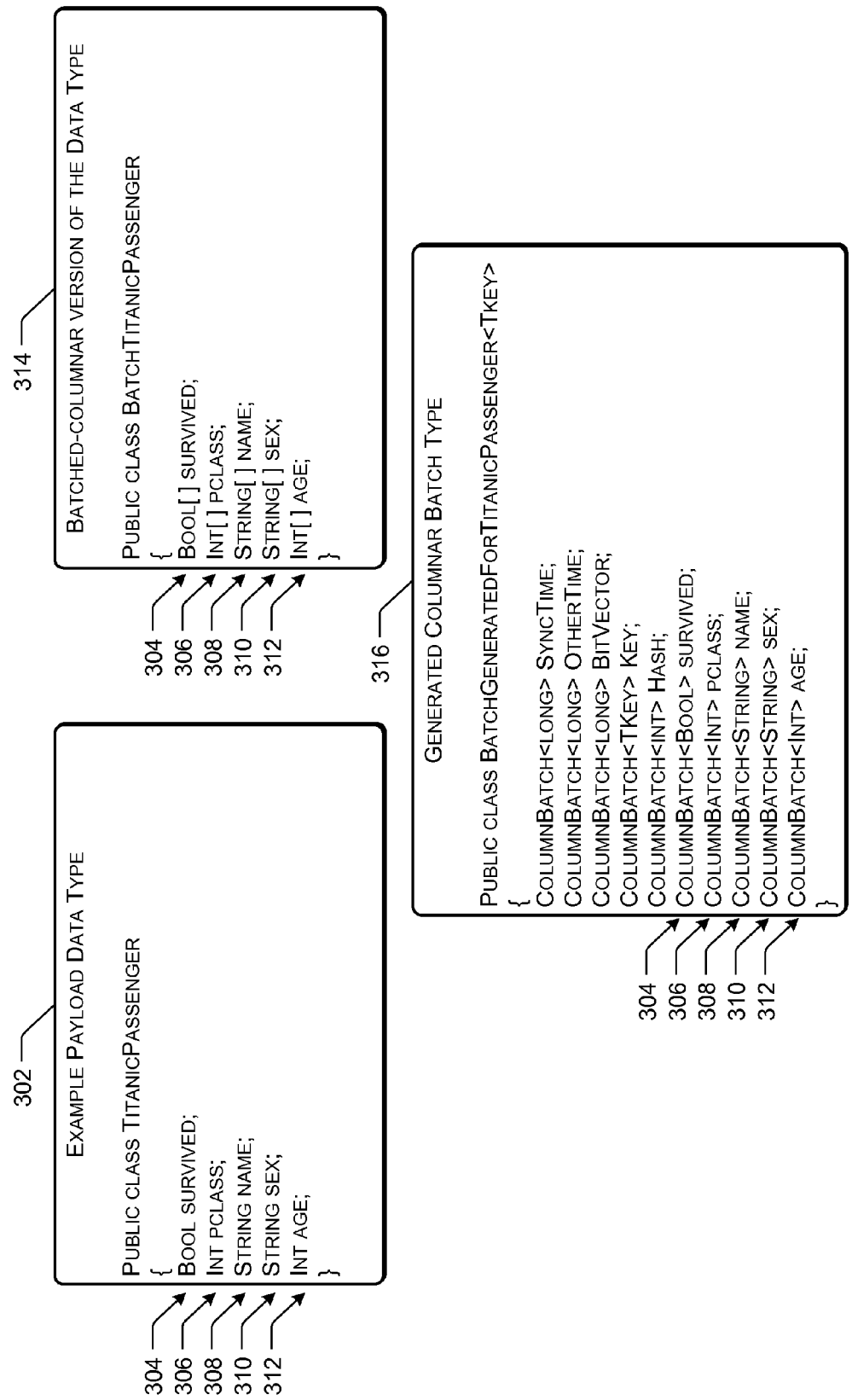
FIG. 3 illustrates comparative examples of several data organizations, according to some implementations.

To illustrate how columnar payload organization is supported, FIG. 3 illustrates an example payload data type 302 that a user is using to write their queries over. In the example of FIG. 3, the payload data type 302 relates to "TitanicPassenger" data and includes five representative fields for illustrative purposes only. In this example, a first field 304 ("survived") identifies whether a passenger did or did not survive the Titanic disaster (i.e., true or false), a second field 306 ("pclass") identifies a passenger class, a third field 308 ("name") identifies a passenger name, a fourth field 310 ("sex") identifies a passenger sex, while a fifth field 312 ("age") identifies a passenger age. It will be appreciated that it is typically more common for these types to have many more fields than the five fields shown in this example.

In the row-oriented mode, the DataBatch message 116 contains an array of values of this type. As shown, each value is an instance of a class, so what is actually kept in the array is an address of a location in a heap where the different fields are stored in contiguous memory (except for the strings, which themselves are heap-allocated objects, so a string-valued field is itself a pointer to somewhere else in memory). This may not provide the data locality desired for high-performance computing. If the type is a "struct" instead of a class, then the values of the fields for each instance are kept within the array itself. This may improve the data locality, but it may often be the case that a particular query accesses only a small subset of the fields (and, as noted above, it is also much more common for these types to have many more fields than the five shown in this example). As such, in executing the query, even though the array of payloads may be accessed in an efficient manner, the sparse access to the fields within each payload means that there is still insufficient data locality.

The present disclosure illustrates that efficiency may be improved by organizing the data as column-oriented data, where there is an array of values for each field. In FIG. 3, a batched-columnar version of the data type is illustrated and generally designated 314. To illustrate, in the batched-columnar version 314, there is an array (identified as "[ ]" in FIG. 3) of "survived" values for the first field 304, an array of "pclass" values for the second field 306, an array of "name" values for the third field 308, an array of "sex" values for the fourth field 310, and an array of "age" values for the fifth field 312. With the data organized as column-oriented where there is an array of values for each field, the implementation of a query may access contiguous elements of the arrays of the fields mentioned in the query to provide a higher level of data locality. Therefore, in some implementations, a column-oriented definition may be generated for each type that the queries are expressed over.

In the columnar data batch organization, the organization of data as a sequence of data batches with columnar control fields and payload fields may improve the speed of serialization and de-serialization of data to and from external locations (such as a local/remote disk or another machine via the network). That is, entire databatch arrays may be written directly to the stream without performing fine-grained encoding, decoding, or processing of individual rows within the data batch, thereby improving the speed.

Further, in the columnar data batch organization, ColumnBatches of strings may be handled specially. To illustrate, a naïve creation of an array of strings may result in a large number of small string objects which can be expensive and affect garbage collection and system performance. Instead, the system of the present disclosure may store all of the strings within the batch end-to-end in a single character array, with additional information on the starts and offsets of individual strings within the array. In some cases, string operations may be performed directly on the character array. Alternatively, in some cases, the system may copy over individual strings on-demand to a small fixed temporary buffer and perform the string operations on that buffer. This organization of strings may also allow for performing serialization and de-serialization of strings in a high-performance manner (e.g., using the bulk write mechanism described above).

FIG. 3 further illustrates an example of a generated columnar batch type 316, in which the type of each field in a column-oriented definition is actually a more complicated type: ColumnBatch<T> (where T is the type of the associated field). In this example, the array of values (e.g., the array of values for the fields 304-312) is just one part of a ColumnBatch, which also stores control parameters.

Figure 4:
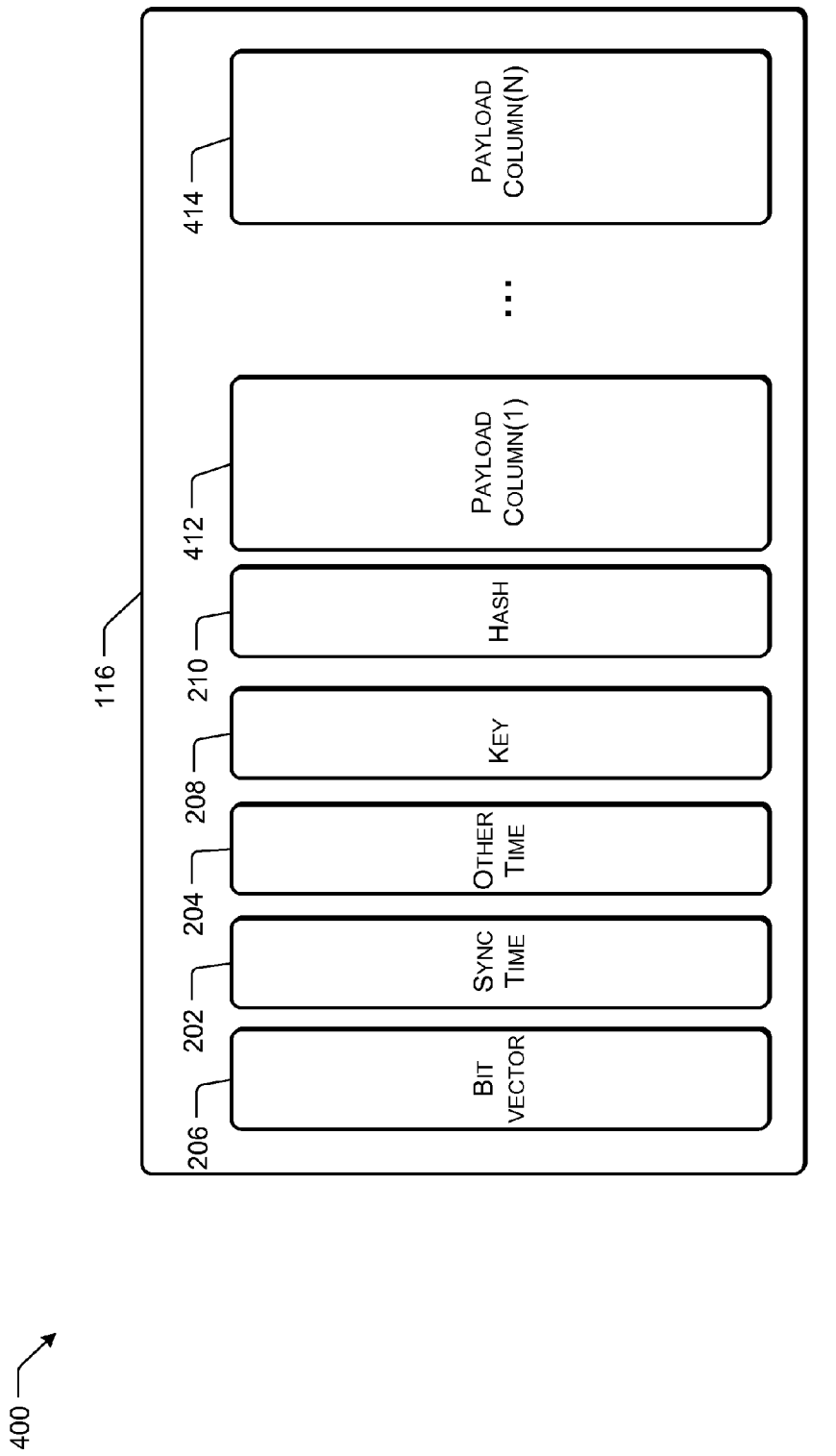
FIG. 4 is a block diagram illustrating an example of data organization within a data batch message that includes multiple columnar payloads, according to some implementations.
Figure 5:
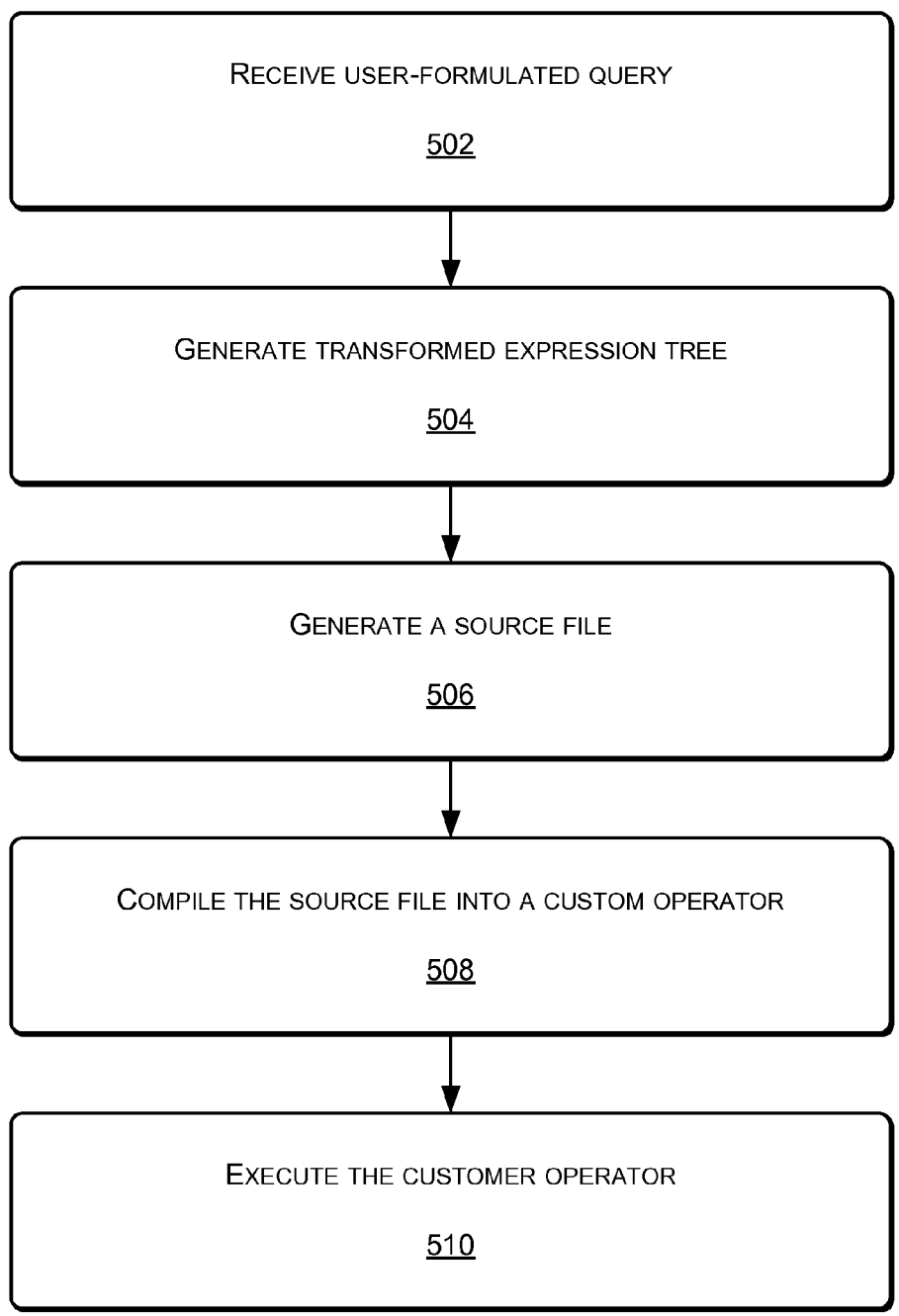
FIG. 5 illustrates an example process flow for code-generation at query compile-time, according to some implementations.

FIG. 4 illustrates an example of data organization within a DataBatch message with multiple columnar payloads and is generally designated 400. Note that, from a user's perspective, queries are still written with a row-oriented view of the data. FIG. 5, described below, illustrates how query processing occurs with columnar payloads.

FIG. 4 illustrates that the DataBatch message 116 may include N columnar payloads. For example, the columnar payloads may include a first columnar payload 412 ("Payload Column(1)") through an Nth columnar payload 414 ("Payload Column(N)"). Referring to previous example that includes the five fields 304-312, the first columnar payload 412 may include an array of "survived" values for the first field 304, while the Nth columnar payload 414 may correspond to a fifth columnar payload that includes an array of "age" values for the fifth field 312. While not explicitly shown in FIG. 4, it will be appreciated that a second columnar payload may include an array of "pclass" values for the second field 306, a third columnar payload may include an array of "name" values for the third field 308, and a fourth columnar payload may include an array of "sex" values for the fourth field 310.

While FIGS. 3 and 4 illustrate an example in which the message is a DataBatch message, the system of the present disclosure also supports control messages such as punctuations and completed messages.

Turning to the topic of memory management, one performance issue in stream processing systems is associated with the problem of fine-grained memory allocation and release ("garbage collection" or "GC"). Traditionally, these are very expensive operations and the same is true in a .NET implementation or similar type of implementation. The present disclosure describes an approach to memory management that retains the advantages of the high-level world of .NET and yet provides the benefits of unmanaged page-level memory management. One advantage of not using unmanaged memory for memory management is avoiding the problem of handling complex .NET types.

In the system of the present disclosure, a memory pool (see e.g., the memory pools 122 of FIG. 1) may represent a reusable set of data structures (see e.g., the data structures 124 of FIG. 1). A new instance of a structure may be allocated by taking from the pool instead of allocating a new object (which can be very expensive). Likewise, when an object is no longer needed, the object may be returned to the memory pool instead of letting the garbage collection process reclaim the memory.

In the system of the present disclosure, there are two forms of pools. A data structure pool may hold arbitrary data structures such as Dictionary objects. For example, this type of pool may be used by operators that may need to frequently allocate and de-allocate such structures. The second type is a memory pool for events, which is associated with a DataBatch type, and contains a ColumnPool<T> for each column type T necessary for the batch. The pool itself may be generated. A ColumnPool<T> contains a pool (implemented as a queue) of free ColumnBatch entries.

ColumnBatch<T> instances are ref-counted, and each ColumnBatch<T> instance knows what pool it belongs to. When the RefCount for a ColumnBatch instance goes to zero, the instance is returned to the ColumnPool. When an operator needs a new ColumnBatch, the operator requests the ColumnPool (via the MemoryPool) for the same. The ColumnPool either returns a pre-existing ColumnBatch from the pool (if any) or allocates a new ColumnBatch.

In a streaming system, the system may reach a "steady state" where all the necessary allocations have been performed. After this point, there may be very few new allocations occurring, as most of the time batches would be available in the pools. In some cases, there may be one memory pool allocated per operator. Further, in some cases, there may be a single global memory pool configuration. In some implementations, there may be one memory pool per core (or socket) serving all operators assigned to that core.

Returning to the idea of query compilation and processing, as discussed above, queries may be expressed against a row-oriented view of the data. In some implementations, the input data sources (e.g., the input data sources 102 of FIG. 1) may be modeled as instances of a type called IStreamable, that can for instance be created from existing data sources such as an IObservable. The application of each logical operator results in another IStreamable, allowing for the composition of larger query plans. Some operators such as "Join" receive two IStreamable instances as input and produce a single result IStreamable. The result of the query construction is therefore an IStreamable—note that at this point, no operators are generated and no query is executing.

Some implementations include binding the query to an execution by creating an observer (e.g., an input observer 114 as in FIG. 1) and subscribing to the query (e.g., the query 108 in FIG. 1) by calling Subscribe( ) on the IStreamable. This causes the compiler to walk the IStreamable DAG, allowing each logical operator to construct a physical operator instance, thereby generating the physical operator DAG (e.g., designated as 112 in FIG. 1). The data sources, on being subscribed to, may start pushing events through the physical operators, producing results that are eventually delivered to the result observers (e.g., the result observers 120 in FIG. 1).

As an illustrative, non-limiting example, consider a stream ps whose payload is of type TitanicPassenger (see e.g., the example payload data type 302 in FIG. 3). A user may have a logical view that the stream includes values of type "TitanicPassenger," and the user may express a query as a method call (e.g., methods such as Where and Select). The argument to each method is a function, where the notation x=>e describes a function of one argument x. When the function is applied to a value (in this case of type TitanicPassenger), the result is the value e.

To illustrate, an example query about passengers on the Titanic may be represented as "ps.Where(p=>p.survived && p.age>30)." In this case, the method Where is a filter. That is, its value is a new stream including those records (tuples) of the original stream whose field survived had a value of true and whose field age was greater than 30. For example, referring to the example payload data type 302 in FIG. 3, the new stream would include those records in which the first field 302 ("Survived") has a value of true and the fifth field 312 ("Age") has a value that is greater than 30.

As another example, an example query about passengers on the Titanic may be represented as "ps.Select(p=>new NewPassenger{NameSex=p.name+",",+p.sex, Age= p.age})." In this case, the method Select is a projection. That is, its value is a new stream including those records (tuples) of a new type, NewPassenger, distinct from TitanicPassenger, that has two fields. The first field is called NameSex and its value is a concatenation of the name field and the sex field of the corresponding record from the original stream. Likewise, the second field is called Age and its value is the value of the age field of the corresponding record. For example, referring to the example payload data type 302 in FIG. 3, the first field NameSex would have a value corresponding to a concatenation of the third field 308 ("Name") and the fourth field 310 ("Sex"). The second field Age would have a value corresponding to the fifth field 312 ("Age").

These example queries may be used to illustrate the different aspects of how the queries are compiled into a form that executes against the data organization described above. As described above with respect to FIG. 3, the data organization does not include the type TitanicPassenger. Instead, the type BatchGeneratedForTitanicPassenger is generated. As such, queries that, at the user level, involve the type TitanicPassenger use the generated type BatchGenerated-ForTitanicPassenger instead. This non-uniformity means that, for efficient execution, the query submitted by the user is compiled into a custom operator. The custom operator is a code module which is loaded (and executed) dynamically in response to a user-formulated query.

Referring to FIG. 5, an example process of code-generation at query compile-time is illustrated and generally designated 500. It will be appreciated that the order or processing (serial/parallel) may be done in alternatives to that shown in the example of process flows in the present disclosure.

In some implementations, the present disclosure includes creating custom physical operators using a combination of an application programming interface ("API") for expression trees (e.g., the .NET API for expression trees) together with meta-programming. An expression tree is an abstract syntax tree representing a fragment of code and uses the type Expression<T> to represent a piece of code of type T. The expression tree API may also contain functionality for transforming abstract syntax trees.

At 502, the process 500 includes receiving a user-formulated query. For example, the user-formulated query may be expressed as a "Select" method call. The type of the parameter for the method Select is Expression<Func<TPayload, U>>, where Func<A,B> is the type of a function that takes an argument of type A and returns a value of type B.

At 504, the process 500 includes generating a transformed expression tree. The transformation may include replacing all references to a field, f, of a value, r, to become references to the $i^{th}$ row in the column corresponding to f. In some implementations, there may be further optimizations such as pointer swings (described further below) that are constant-time operations on a batch, instead of having to iterate over each row in a DataBatch.

FIG. 5 illustrates one example implementation of transforming a user query expressed using a row-oriented model to create executable code that accesses the column-oriented view of the data. In the particular example illustrated in FIG. 5, after generating the transformed expression tree, the process 500 includes generating a source file (e.g., a C# source file), at 506. In some cases, meta-programming capabilities may be used to create the source file, and the process 500 may include compiling the source file into a customer operator, at 508. The custom operator may include a code module which may be loaded and executed dynamically in response to the user-formulated query, as shown at 510. The transformed expressions may be in-lined into the operator.

In some cases, it may not be possible to generate a custom operator. For example, a query might require calling a method on an instance of TitanicPassenger. In such a situation, we may or may not be able (or want) to recreate an instance given the values for its fields. We then transform the data back to the row-oriented format and use the non-generated static (generic) definition of the operator (i.e., where each DataBatch has a column of Payload values).

Alternative methods may be used to transform code that is specified using the row-oriented model to the column-oriented model. For example, this may include performing a binary transformation at the machine code level (either at the IL level or even at a lower machine-specific layer). As another example, instead of generating C# source file and then compiling the file (e.g., as shown in steps 506 and 508 in the example of FIG. 5), one or more application programming interfaces (APIs) may be used for directly emitting executable code (e.g., the Reflection.Emit APIs in .NET). Another option may include the use a "rewriting framework" that takes as input the low-level machine code, decompiles it into a higher-level representation and then the transformations happen at that level. The rewriting framework then has mechanisms for producing executable machine code from the transformed high-level representation. As another example, the system may restrict the user to a particular programming system that provides access to the associated source code (that is, rather than users providing executable code directly to the system) for use in source-level transformations.

The end result of this transformation is that we have, in a fully incremental streaming setting, the following capabilities: the ability to use a columnar data representation when possible; the flexibility of using complex types by reverting to non-generated row-oriented code when necessary; and the ability for users to write their queries using a single row-oriented view of the data.

In some implementations, the same meta-programming techniques may be used to generate specialized operators for transforming a row-oriented DataBatch into a column-oriented DataBatch (and vice-versa). This can occur either because of some property of the user type prevents it from being used in column-oriented processing, some limitation in the operator, or an expression in the query is too complex or opaque to allow its transformation. In any case, data usually enters and leaves the system as row-oriented and thus is to be transformed at the beginning of the processing pipeline into columnar format and then re-created in row format at the end of the pipeline.

The present disclosure also supports compile-time stream properties that define restrictions on the stream. For example, each IStreamable may carry with it a set of properties that propagate across operators in the logical plan (e.g., the logical query plan 104 in FIG. 1). When translating the query into its DAG of physical operators, the properties included with the IStreamable may be used to choose specific operator implementations that perform well for the given properties. For example, an interval-free stream may use a version of an "Aggregate" operator that does not need to remember information about future end-edges (endpoints of intervals).

As explained above, in the present disclosure all operators are SyncTime-ordered, and ingest/produce data in non-decreasing order of SyncTime. In cases where data arrives out-of-order, disorder may be removed (e.g., by buffering and reordering) before feeding the data to the engine.

As an illustrative example, with respect to Where (filtering), consider the following example code:

for (int=0; i<input.Count; i++)
        if (!BitVector[i]) {BitVector[i]=!predicate(input.Payload[i];}

In this example, in the row-oriented mode, the filtering operator iterates over each row in the DataBatch, and if that row represents a valid tuple in the data, applies the user-supplied predicate to the payload. The BitVector is updated to record the value of the predicate. Note that predicate is a compiled form of the function that the user wrote.

The custom operator for Select in the example gets an input value, input, of type BatchGeneratedForTitanicPassenger. There are no values of type TitanicPassenger to apply the predicate to. Instead, the operator is made more efficient by inlining the body of the (transformed) predicate which just accesses the columns corresponding to the fields survived and age.

With respect to Select (Projection), as an illustrative example, consider the following examples of code:

for (int=0; i<input.Count; i++)
        if (!BitVector[i]) {BitVector[i]=!(input.survived[i] && input.age[i]>30);}
    for (int=0; i<input.Count; i++)
        if (!BitVector[i]) {output.NameSex[i]=input.name[i]+ ","+input.sex[i];}

As with the filter, the custom operator for Select is much more efficient because it accesses only the columns mentioned in the query. For instance, the value of the "NameSex" field is set by iterating over each row i in the batch. The assignment is done conditionally because we have to check the BitVector to make sure that the row may be considered valid or not. However, there are even opportunities for further optimization. For example, there is not an assignment for the Age field within the loop. That is, because the value of that field for every row in the output is exactly the value of the field for that row in the input. Since the fields are independent objects (of type ColumnBatch<int>), the same column can be shared between the input and output. This is referred to herein as a "pointer swing." That is, rather than iterating over each row i, instead a single assignment (i.e., output.Age=input.Age;) may be performed once at the message (batch) level.

Figure 6:
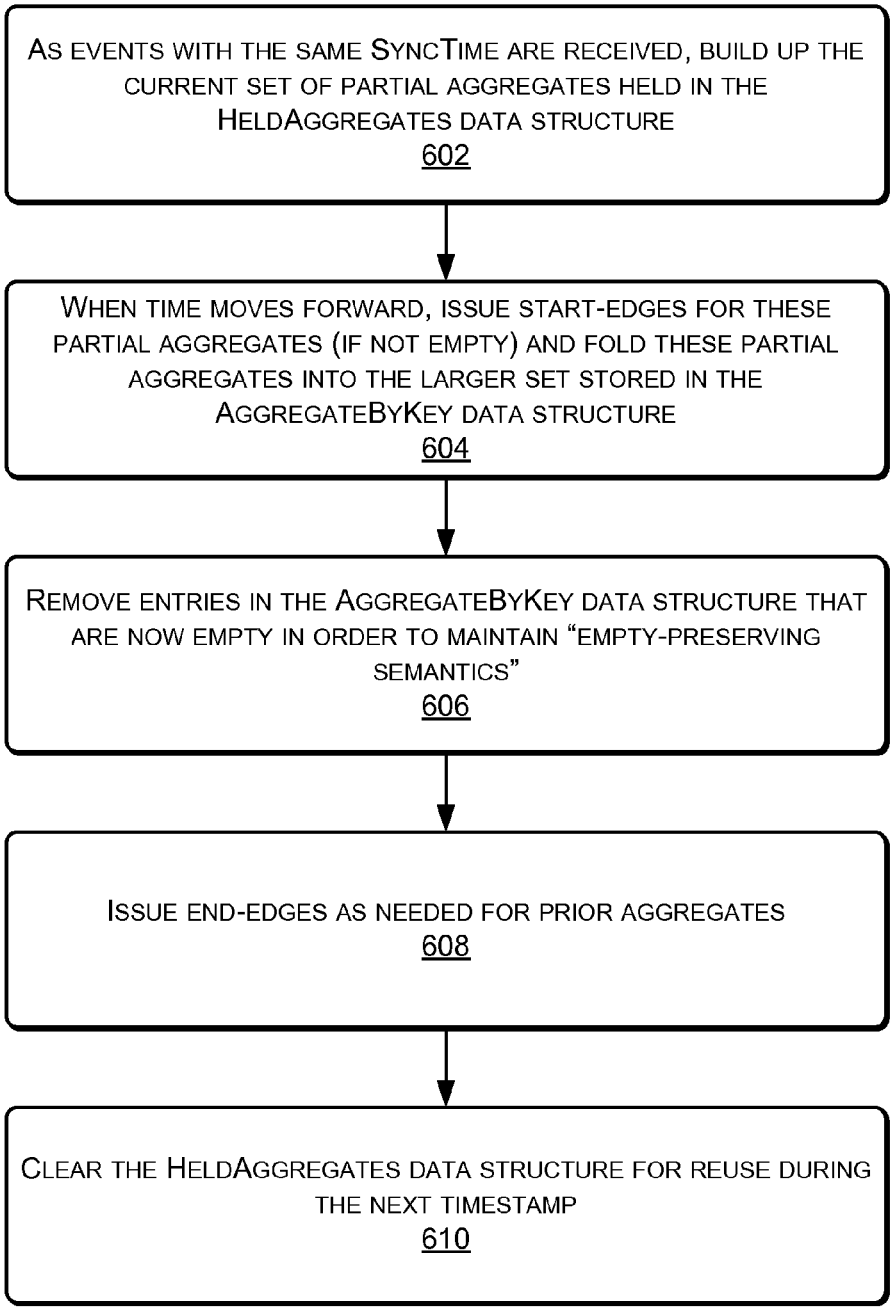
FIG. 6 illustrates an example process flow for producing incremental snapshot-oriented results, according to some implementations.

Referring now to FIG. 6, an example process associated with a snapshot operator producing incremental snapshot-oriented results is illustrated and generally designated 600.

The snapshot operator is a basic operator in the system of the present disclosure that produces incremental snapshot-oriented results. A set of algorithms for the snapshot operator may achieve high performance while adhering to the temporal semantics of the operation. The process 600 illustrated in FIG. 6 corresponds to a particular case in which a stream has arbitrary events. As such, intervals may present endpoints in arbitrary order. Therefore, a data structure may be employed such that items can be added in arbitrary order of time, but that allows retrieving in increasing timestamp order.

Recall that every stream is grouped, i.e., every event has a grouping key. The aggregate operator uses two data structures to store state related to the aggregation operation. The first data structure includes an "AggregateByKey" data structure that represents a hash table that stores, for every distinct key associated with non-empty state at the moment, an entry in the hash table with that key and the associated state. The second data structure includes a "HeldAggregates" data structure. This is a hash table called "FastDictionary" (described further below) that stores, for the current timestamp T, all the partial aggregated state corresponding to keys for which events arrived with sync time equal to T. This hash table is emptied out whenever time moves forward. It does not require the ability to delete individual keys, but requires the ability to iterate through all entries very fast, and clear the hash table very fast when time moves to the next value.

Referring to FIG. 6, the snapshot operator operates as follows. At 602, as events with the same sync time are received, the process 600 includes building up the current set of partial aggregates in the HeldAggregates data structure. As shown at 604, when time moves forward, the process 600 includes issuing start-edges for these partial aggregates (if not empty) and folding these partial aggregates into the larger set stored in AggregateByKey data structure.

At 606, the process 600 includes removing entries in the AggregateByKey data structure that are now empty in order to maintain "empty-preserving semantics." The process 600 further includes issuing end-edges as needed for prior aggregates, at 608, and clearing the HeldAggregates data structure for reuse during the next timestamp.

While not illustrated in FIG. 6, the process 600 may also include maintaining an endpoint compensation queue (or "ECQ") that contains, for each future endpoint, partially aggregated state for that endpoint. Whenever time moves forward, the endpoints may be processed between now and the new timestamp from the ECQ. The aggregate operator implementation of the present disclosure may also cache the state associated with the currently active key, so that the common case where all events have the same key can be executed very efficiently without hash lookups.

Further, in an alternative case, the stream has only start and end edges. As such, an ECQ is not needed to store endpoints. The algorithm therefore becomes simpler with less code and thus is more efficient. In another alternative case, the stream has start edges, end edges, and/or intervals of constant duration. As such, the intervals provide information for future points, but the information is presented in non-decreasing order. This implies that we can store the ECQ as a FIFO queue that adds items at one end and removes items from the other end.

As described above, the HeldAggregates data structure is a hash table that may be referred to as a "FastDictionary." The FastDictionary may represent a lightweight .NET dictionary that is optimized for frequent lookups, small sets of keys, frequent clearing of the entire data structure, and frequent iteration over all keys in the table. The FastDictionary attempts to minimize memory allocations during runtime and hash computations.

FastDictionary uses open addressing with sequential linear probing. The basic data structure is a prime-number sized array A of <key, value> pairs. An entry to be looked up or inserted is hashed to an index in A. If that entry is occupied, FastDictionary may scan entries in A sequentially until the element is located (or an open slot which indicates lookup failure). The sequential probing is well suited to CPU caching behavior, and with a suitably low load factor ($1/16$ to $1/8$), there is a high likelihood of finding an element very quickly. We resize the hash table when necessary to maintain the low load factor.

The array A is augmented with a bitvector B, which has one bit per array element to indicate whether that entry is used. B allows iteration to be performed very efficiently, and insertion can find an empty slot index without having to access A. Further, clearing the dictionary is straightforward: we simply zero out the bitvector. Note that this means that the GC can free older values only when entries are reused later, but this is usually not an issue. Accesses to the bitvector are very fast due to cache locality. In some implementations, FastDictionary may perform up to 40% better than a standard .NET Dictionary for streaming workloads, when used inside the aggregation operator to maintain partial aggregation states for the current timestamp.

Referring now to FIGS. 7 and 8, example processes associated with a temporal join operation that operates on input data events in SyncTime order across two inputs are illustrated and generally designated 700 and 800.

The join operation is implemented as an equijoin with delegates provided to determine a mapping key for each payload. The join key is the same as the grouping key associated with the stream. When a payload from the two inputs has the same key and overlaps temporally, the join executes another delegate to generate output for the pair of payloads. Outer join is implemented as an equijoin where all payloads have the same mapping key. In the present disclosure, we describe optimizing the join operation for two special cases. In the first case illustrated in FIG. 7, the input has only start edges and events will not be removed from the synopsis, while in the second case illustrated in FIG. 8, the input has arbitrary events.

Referring to FIG. 7, the process 700 includes processing all input events in sync-time order, at 702. The processing of an input event includes inserting the input event into a map data structure, with a key equal to a mapping key of the input event and a value equal to a payload of the input event. At 704, the process 700 includes searching the map data structure for an alternate input to identify events that are received with the same mapping key from the alternate input. Any payloads that are identified as having the same mapping key correspond to a successful join for which the operator will generate output, at 706.

Referring to FIG. 8, the process 800 illustrates the second case in which the input has arbitrary events. When the input events can include intervals and end edges, then the operator handles the case of events being removed. The operator still employs two map data structures similar to the start edge case, but also employs an endpoint compensation queue to remove intervals once time progresses to their ending timestamp, as shown at 802. Additionally, the operator cannot determine which newly processed payloads successfully join start edges from the alternate input until time progresses beyond the current timestamp (because any active start edges could always be ended by an end edge). Note that this delay in output generation is only for the case of an event joining against a start edge because intervals have known ending timestamps. When events are removed from the map, either by end edges or the reaching of an interval's ending timestamp, the operator performs a search of the alternate input's map to identify payloads which joined previously, as illustrated at 804. For each of those payloads, the operator outputs a corresponding end edge, at 806. While not illustrated in FIG. 8, the case of an interval joining with an interval is handled specially because the exact duration of the join is known beforehand, so the operator outputs an interval for the corresponding duration.

Further, while not illustrated in FIG. 7 or 8, there are specialized versions of "Join" to handle two cases. In the first case, the inputs are asymmetric, and the join operation is referred to as an "Asymmetric Join." That is, the right side is much smaller/lower throughput than the left side. In the second case, the inputs are sorted by the join key or its superset, and the join operation is referred to as a "Sort-Order-Aware Join." These variants of Join are discussed further below.

In the present disclosure, a "WhereNotExists" operator and a "Clip" operator represent "anti-joins" that output only those events received on their left input that do not join with an event received on the right. Similar to join, the user provides delegates to determine a mapping key for each payload. Clip is a restricted form of WhereNotExists that is optimized for the common case of permanently clipping an event received on the left when a future right event successfully joins with it. The implementations for the two operators may be optimized differently.

For the "WhereNotExists" operation, all input events received on the left input are processed, in sync-time order, and inserted into a map data structure with the key and value equal to the mapping key and payload, respectively, of the input event. Similarly, input events received on the right input are processed in sync-time order and inserted into a data structure that counts the number of occurrences of a mapping key on the right input. Any start edge events received on the right input, for which it is the first occurrence of that key, results in a scan for any joining left inputs which require the output of an end edge. Similarly, any end edge events received on the right input, for which the resulting occurrence count drops to zero, results in a scan for any joining left inputs which now require the output of a start edge. Only when time progresses on the right input is a scan performed to search for any newly inserted left events that do not join with any event on the right to output an initial start edge.

The "Clip" operation is similar but a much more optimized version of WhereNotExists. In Clip, only events received on the right at a later timestamp can join to events received on the left. As a result, no right state may be maintained. Instead, only a map of events received on the left input is required. As events are received on the left, the operator outputs a corresponding start edge and inserts the event into a map. As events are received on the right, the operators performs a scan in the map to locate any joining left events. All joining left events will be removed from the map and output an end edge.

In the present disclosure, Join, WhereNotExists and Clip may be scaled out by writing them as GroupApply operations, as described further below. The GroupApply operation sets the key of the stream to the join key. The above operators assume that the key of the stream is the equijoin attribute, thus join works efficiently and interoperates correctly in the context of GroupApply.

Referring now to the concept of Punctuations and the passage of time, data events also serve as implicit punctuations until the sync time of the event because of the property that all streams are in non-decreasing sync time order. The streaming engine of the present disclosure retains an explicit notion of punctuations, but for two distinct reasons. First, punctuations signify the passage of time during periods of lulls (i.e., no data). Note that even if the input stream has data events, there may be an operator such as Where that filters out most (or all) events leading to lulls in its output stream. Second, the streaming engine tries to maximize performance by ingressing data in batches. Likewise, operators write output data events to a temporary holding batch, and wait before propagating the batch to the next downstream operator, until either the batch is full or a punctuation or a completed control event is received. Thus, punctuations serve to "kick the system" and force it to generate output regardless of the current state of operators in the query plan. Thus, punctuations in Trill allow users to control the throughput/latency tradeoff by controlling how aggressively data is batched, and when data is forced to egress out from the system.

Punctuations and the data batch maximum size control the throughput/latency tradeoff Operators try to fill up a batch before sending it to the next operator, thereby introducing latency. Users may introduce frequent punctuations in order to force the engine to output batches early, thereby reducing latency. However, a very frequent punctuation strategy may result in many batches being almost empty, which could result in a significant waste of memory.

A simple first step towards solving this problem is to allow users to control the batch size using a global configuration setting. This allows us to avoid some really bad cases, but does not cover the cases where different operators see different punctuation frequencies due to query and data semantics. For example, an input may have a punctuation every 1000 events, but the result of a filter with selectivity 0.2 would have a punctuation every 200 events. The punctuation frequency may also be data dependent and change with time (e.g., how many tuples join with a given input in Join). Thus, we propose a dynamically adaptive batch-size setting algorithm that works as follows. Let DefaultBatchSize denote the "ideal" batch size in the absence of punctuations, where performance does not improve significantly (on expectation) when the batch size is increased further (80,000 by default). Let StartBatchSize be the smallest batch size that gives reasonable performance on expectation, such that a lower batch size degrades performance significantly (250 by default).

Figure 9:
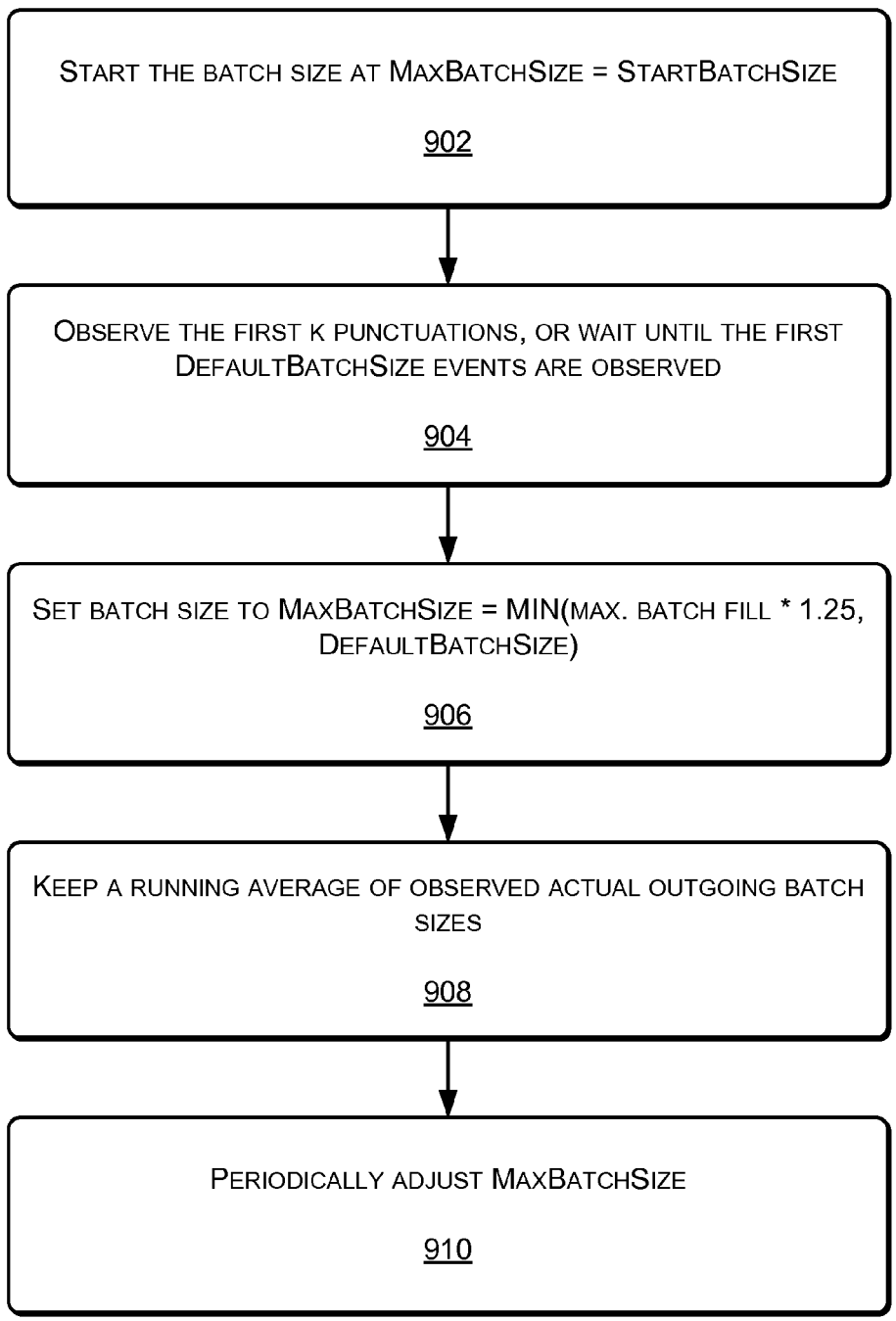
FIG. 9 illustrates an example process flow for dynamically setting a batch-size, according to some implementations.

Referring now to FIG. 9, an example process associated with a dynamic batch-size setting algorithm is illustrated and generally designated 900. The process 900 includes, for each operator, starting the batch size at MaxBatchSize=StartBatchSize, at 902. At 904, the process 900 includes observing the first k punctuations, or waiting until the first DefaultBatchSize events are observed.

In the illustrative example of FIG. 9, the process 900 includes setting the batch size to MaxBatchSize=MIN(max. batch fill*1.25, DefaultBatchSize), at 906. Further, the process 900 includes maintaining a running average of observed actual outgoing batch sizes, at 908, and adjusting the MaxBatchSize periodically, at 910.

The memory pools (per operator) are also modified to handle varying batch sizes by allowing us to return batches of the older size to the GC instead of returning them to the pool. As a result, the memory pool at any given moment only contains batches of a fixed size, which may adjust periodically.

The system of the present disclosure also supports the notion of grouped sub-queries. The basic idea is that given an input stream, the user provides a grouping key and a subquery to be executed for every distinct value of the key. Logically, the sub-query is executed on every substream consisting of events with the same distinct value of the key. The GroupApply operator in Trill executes such a query very efficiently on a multi-core machine. We now describe the novel two-stage architecture of GroupApply that makes this possible.

Figure 10:
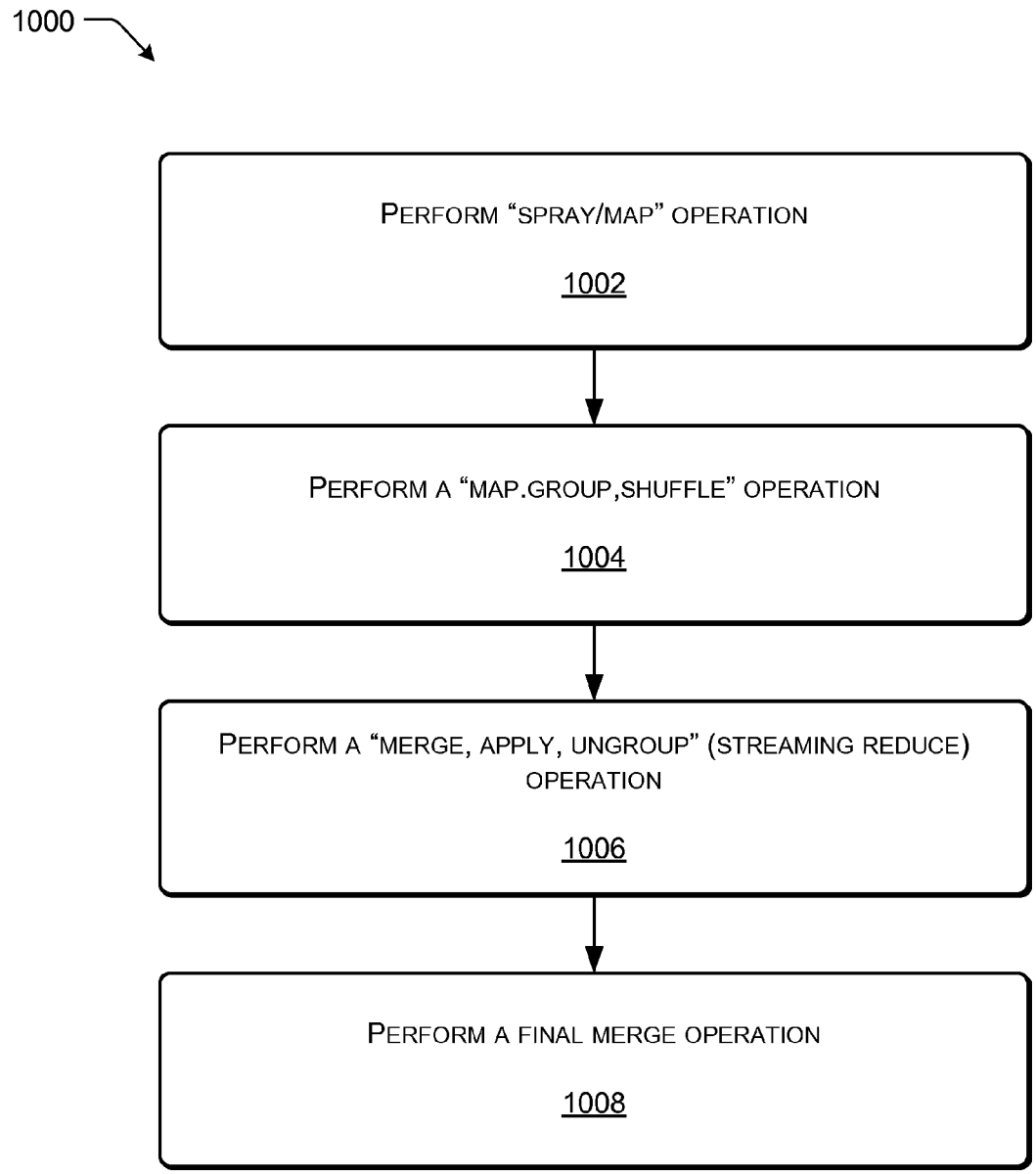
FIG. 10 illustrates an example process flow for grouping sub-queries, according to some implementations.

Referring now to FIG. 10, an example process associated with a grouping of sub-queries is illustrated and generally designated 1000. The present disclosure includes logically modeling the GroupApply operator using a two-stage streaming GroupApply architecture. The operation has multiple stages that we describe next. Overall, there are NumBranchesL1 copies of the map/shuffle stage, and NumBranchesL2 copies of the apply/reduce stage.

The process 1000 includes, at 1002, performing a "Spray/Map" operation that takes a stream of batches and performs a stateless spray of the batches to multiple cores (equal to NumBranchesL1) via blocking concurrent queues. This operator performs a constant amount of work per batch and hence introduces negligible overhead to the system.

At 1004, the process 1000 includes performing a "Map/Group/Shuffle" operation. This operator resides on each of NumBranchesL1 cores and receives events in a round-robin fashion from the sprayers. The shuffle maintains NumBranchesL2 number of output batches. For each incoming batch, the operator applies the map subquery and then generates the grouping key and its associated hash function on the resulting stream. Based on the hash value, the operator stores the tuple in one of the NumBranchesL2 partial output batches. When an output batch gets filled up, the batch is delivered to the corresponding "Apply" branch via a lock-free blocking concurrent queue.

At 1006, the process 1000 includes performing a "Merge/Apply/Ungroup" (streaming reduce) operation. At each of the NumBranchesL2 cores, the operator first performs a union of data from NumBranchesL1 upstream inputs. The union is a temporal union (maintaining timestamp order) in order to retain the invariant that all streams are in strict sync-time order. This is followed by an application of the reduce sub-query on each of the cores. This is followed by an ungroup operation that unpeels the grouping key (nesting is allowed). The results of these are supplied to a "Final Merge" operator to perform a final merge operation, at 1008.

In the final merge operation, the result batches from the reduce operations are merged into a single output stream in temporal order. This operation is performed by the same merger described above at 1006 that merges multiple streams into one. Merging may include the use of a sequence of cascading binary merges in order to scale out the merge across multiple cores (each binary merge can potentially reside on a different core). Further, the use of binary merges may provide significant performance benefits over using a priority queue to perform a single n-way merge. In some implementations, three cores are used to perform the merge: one for the root, and two more for the left and right sub-trees respectively, although other configurations are also possible.

The system of the present disclosure also supports an apply branch with two inputs. The basic idea and architecture are similar to the description above, except that there are two separate map phases for each of the inputs, and these map outputs are shuffled and brought together to a single set of two-input reducers. The details are omitted for brevity.

With respect to sorted data and exploiting such sorting, when performing offline relational queries (including progressive queries), the system of the present disclosure provides the ability to pre-sort the data by some key in order to optimize query processing. The system of the present disclosure supports a compile-time property to identify whether the data is snapshot-sorted (i.e., whether each snapshot is sorted by some payload key). In case of progressive data, snapshot-sorted implies a global sort order for the data.

The system of the present disclosure also supports the notion of sort-order-aware data packing. The basic idea here is that sorted data is packed into batches according to the rule that for a given batch B, data with a given sort key value K cannot spill to the next batch B+1, unless all the data in batch B has the same sort key value K.

The spray phase (See e.g., FIG. 10, at 1002) of GroupApply can exploit this packing scheme to retain the sort order during spray. Basically, it retains the last key in the current batch B before spraying it to core i. In case the first element in the next batch B+1 has the same key value, that batch is also sprayed to the same core i. Otherwise, the batch B+1 is sprayed as usual to the next core i+1 (or modulo the number of cores). This choice allows the sort ordering and packing property to be retained within each downstream branch.

Further, if the GroupApply key happens to be equal to or a subset of the sorting key, we move the apply sub-query into the spray phase, thereby completely avoiding the shuffle.

With respect to Join operations, the system of the present disclosure supports a variant of join called the "AsymmetricJoin." The basic idea is that if the left side of the join is such smaller than the right side, we multicast the left side to all the cores and simply spray the right side round-robin across the join operator instances. This allows us to completely avoid the shuffle phase of the map-reduce, at the expense of having a duplicate copy of the (smaller) left side at all cores. The user is allowed to choose this variant of Join by specifying an optional parameter to the Join operator. The asymmetric join operation is supported by an asymmetric two-input reduce phase that multicasts the smaller side and sprays the larger side of the reducer.

The system of the present disclosure supports another variant of join called a "Sort-Order-Aware Join." In case the data is sorted by same key (or a superset) as the join key, a more efficient version of join may be used that does not perform any hashing of tuples. This is similar to the merge join operator in databases. The system automatically chooses between the traditional hash join and the merge join based on compile-time stream properties.

The system of the present disclosure also supports "Schedulers." In one implementation, the GroupApply operator is used as the building block for scaling out to multiple processor cores. Further, in some cases, a more general scheduler mechanism may allow more effective sharing of resources across multiple queries and operators. The basic idea is to create and assign a scheduler per core, and allocate operators across these schedulers. The scheduler logic operates purely at batch boundaries, thus avoiding a performance penalty. Communication across schedulers (in case a downstream operator is assigned to a different scheduler) is accomplished using efficient lock-free queues of batched messages.

Example Computing Device and Environment

Figure 11:
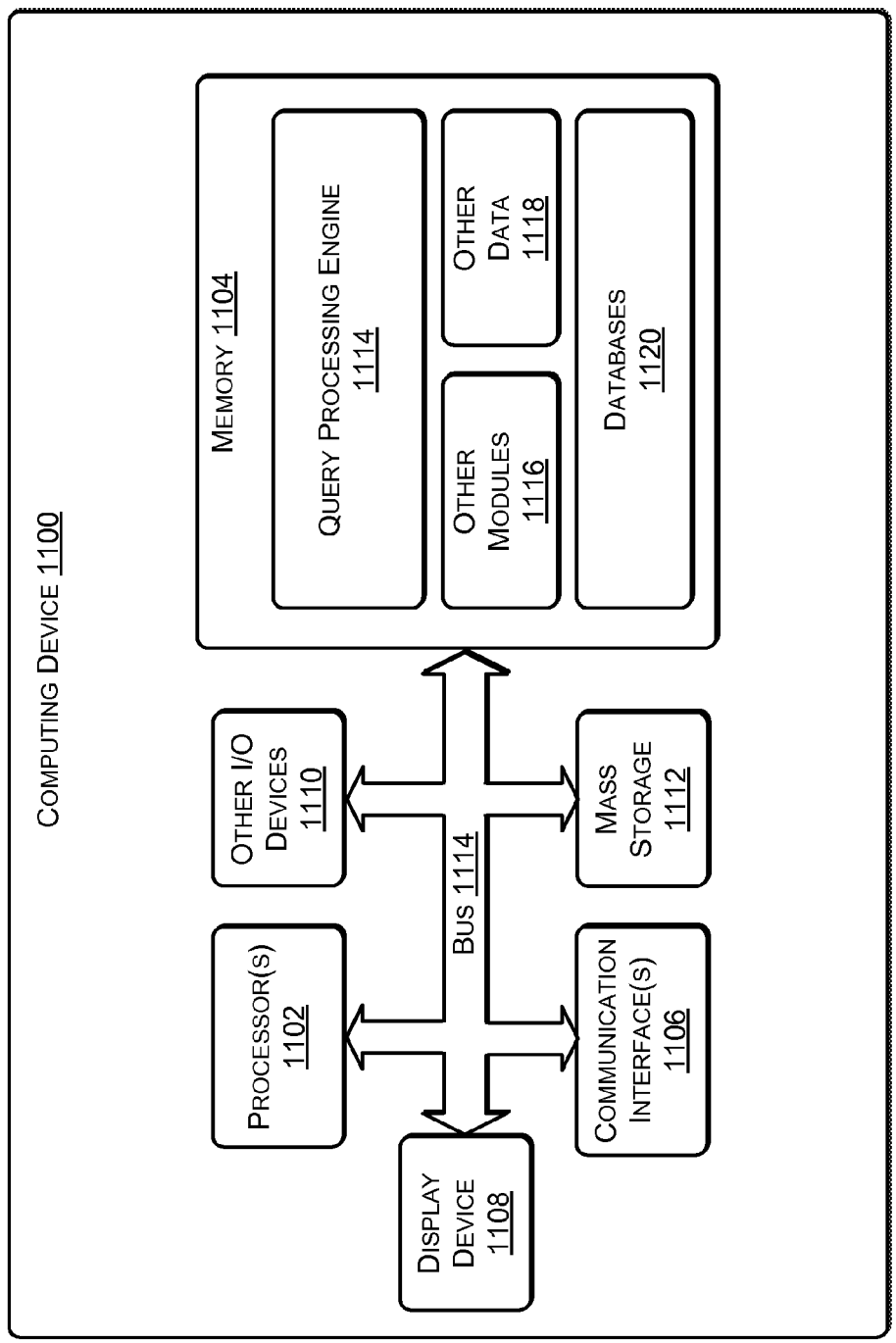
FIG. 11 illustrates an example computing device and system environment in which some implementations may operate.

FIG. 11 illustrates an example configuration of a computing device 1100 and an environment that can be used to implement the modules and functions described herein.

The computing device 1100 may include at least one processor 1102, a memory 1104, communication interfaces 1106, a display device 1108 (e.g. a touchscreen display), other input/output (I/O) devices 1110 (e.g. a touchscreen display or a mouse and keyboard), and one or more mass storage devices 1112, able to communicate with each other, such as via a system bus 1114 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions stored in the memory 1104, mass storage devices 1112, or other computer-readable media.

Memory 1104 and mass storage devices 1112 are examples of computer storage media for storing instructions which are executed by the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein, and may be computer-readable media capable of storing computer-readable, processor-executable program instructions as computer program code that can be executed by the processor 1102 as a particular machine configured for carrying out the operations and functions described in the implementations herein.

The computing device 1100 may also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like. Communication interfaces 1106 can also provide communication with external storage (not shown), such as in a storage array, network attached storage, storage area network, or the like.

The discussion herein refers to data being sent and received by particular components or modules. This may not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 1108, such as touchscreen display or other display device, may be included in some implementations. Other I/O devices 1110 may be devices that receive various inputs from a user and provide various outputs to the user, and may include a touchscreen, such as a touchscreen display, a keyboard, a remote controller, a mouse, a printer, audio input/output devices, and so forth.

Memory 1104 may include modules and components for execution by the computing device 1100 according to the implementations discussed herein. In the illustrated example, memory 1104 includes a query processing engine 1114 as described above. Memory 1104 may further include one or more other modules 1116, such as an operating system, drivers, application software, communication software, or the like. Memory 1104 may also include other data 1118, such as data stored while performing the functions described above and data used by the other modules 1116. Memory 1104 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 11 as being stored in memory 1104 of computing device 1100, the query processing engine 1114, or portions thereof, may be implemented using any form of computer-readable media that is accessible by computing device 1100. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Thus, the present disclosure describes a high-performance lightweight stream processing engine that may execute temporal streaming queries at speeds between 10 and 1000 times faster than existing engines. This level of performance may result from a bottom-up emergent system design, along with techniques such as aggressive physical batching, columnar data storage with row-oriented data access, code-generation for highly optimized operations, a carefully restricted physical model with new sync-time-ordered operator algorithms, and a careful separation of fine-grained work performed with each event and coarse-grained work performed at boundaries of groups (or batches) of events. Thus, the processing engine of the present disclosure may represent a "one-size-fits-many" engine that may be effectively and efficiently used for real-time and offline temporal queries, as well as relational queries and progressive relational queries.

Some examples include a batched sequential physical data organization for a streaming engine (without affecting result semantics), along with an emergent engine design pattern that carefully separates fine-grained work from course-grained work (at batch boundaries) during query processing. In the present disclosure, incoming data may be carefully organized into batches, with the flow of batches through the graph of stream operators, the building and outputting batches at each operator, the output of results in batches, and the use of well-defined logical semantics ensuring that batching does not affect result content or correctness, but only potentially actual latency, and the architecting of the system to perform expensive work at batch boundaries while carefully executing fine-grained intra-batch work inside operators in tight loops.

In some examples, a constrained sync-time ordered physical data model may be used along with associated high-performance algorithms for the streaming of tempo-relational operations such as snapshot aggregation, join, and set difference. That is, the streaming engine of the present disclosure may restrict the nature of data that is present in the batches so that operators can use more efficient algorithms, along with a set of operator algorithms and data structures that exploit these physical restrictions.

In some examples, the present disclosure describes the re-interpretation of punctuations to signify the passage of time as well as forcing output generation in a batched sequential streaming engine, and enable the introduction of adaptive batch sizing to open up the exploitation of the associated latency-throughput tradeoff That is, the present disclosure describes extending the notion of punctuations, a concept that is common in stream systems, to force output generation and flushing of partially filled batches and to denote the passage of time as in traditional punctuations. Further, this new definition of punctuations may be leveraged to provide users with an ability to exploit the tradeoff between throughput (more throughput with larger batches) and latency (low latency with smaller batches). Further, the adaptive setting of maximum batch sizes may be exploited to better control the memory and CPU overhead of batching.

In some implementations, bitvector filtering and columnar data organization may be used in the streaming engine as techniques to minimize data movement between CPU and main memory and to improve throughput by maximizing the use of main memory bandwidth. That is, the present disclosure may utilize the design principle of architecting a streaming engine with the goal of minimizing data movement between main memory and caches, along with specific techniques to enable this design, such as bitvector filtering using a bitvector within each batch, and a columnar organization of control and payload fields within a batch.

Some examples include techniques to automatically and transparently control row-oriented data access and query specification in a high-level language to column-oriented inlined data access inside a streaming engine (with the above-mentioned physical data organization) using dynamic code generation and compilation. Further, the system of the present disclosure provides the ability to transparently fallback to row-oriented execution in the case of complex types or complex user expressions over the types in queries, in the context of a query language that takes arbitrary row-valued functions as user input. Further, the system of the present disclosure provides the ability to transition from row-oriented to column-oriented data organization (and vice versa) within a query plan in the context of the above streaming engine design, in a query-dependent manner.

Some examples include techniques and arrangements for a two-stage scale-out architecture for scaling out grouped subqueries (e.g., "GroupApply") with potentially more than one input across multiple processor cores, along with the use of compile-time properties and algorithms to exploit asymmetry and sort orders in the input streams.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
under control of one or more computing devices:
receiving a real-time or near real-time query for a stream of incoming data events;
annotating each individual data event of the incoming data events with a first timestamp and a second timestamp, wherein:
the first timestamp identifies when the individual data event is received; and
the second timestamp identifies additional information associated with the individual data event;
organizing the stream of the incoming data events into a sequence of data batches based at least in part on the first timestamp of each individual data event of the incoming data events, wherein individual data batches, of the sequence of data batches, include multiple data events; and
processing the individual data batches of the sequence of data batches in a non-decreasing time order, wherein each individual data batch stores:
a key array that includes an array of grouping key values, the grouping key values representing a logic group of a data event, and
control parameters that include:
a synctime array that includes synctime values of at least some events in an individual data batch, and
an othertime array that includes othertime values that indicate known future times that individual ones of the events in the individual data batch are expected to end;
based on at least one of the key array, the synctime array, and the othertime array, presenting a result comprising one or more values from the stream of incoming data events in response to the received real-time or near real-time query.

2. The method of claim 1, wherein the particular data batch of the individual data batches stores a payload array of all payloads within the particular data batch.

3. The method of claim 2, wherein the payloads are arranged in a columnar format.

4. The method of claim 1, wherein the control parameters are stored in a columnar format.

5. The method of claim 4, wherein the control parameters stored in the columnar format further include:
a bitvector that includes an occupancy vector representing an array with one bit; and
a hash array that includes an array of hash values.

6. The method of claim 1, wherein each incoming data event is not annotated with a third timestamp.

7. The method of claim 1, wherein for a particular incoming data event:
the particular incoming data event includes an interval event;
the first timestamp includes a start time of the interval event; and
the additional information identified by the second timestamp includes a known future time that the interval event is to end.

8. The method of claim 1, wherein particular incoming data events include a start-edge event and an end-edge event.

9. A computing system comprising:
one or more processors;
one or more computer readable media maintaining instructions that, when executed by the one or more processors, cause the one or more processors to perform acts comprising:
receiving a real-time or near real-time query for a stream of incoming data events;
annotating each individual data event of the incoming data events with a first timestamp and a second timestamp, wherein:
  the first timestamp identifies when the individual data event is received; and
  the second timestamp identifies additional information associated with the individual data event;
organizing the stream of the incoming data events into a sequence of data batches based at least in part on the first timestamp of each individual data event of the incoming data events, wherein individual data batches store a key array that includes an array of grouping key values, the grouping key values representing a logic group of a data event;
processing the individual data batches in the sequence of data batches in a non-decreasing time order, wherein each individual data batch stores:
  a key array that includes an array of grouping key values, the grouping key values representing a logic group of a data event, and
  control parameters that include:
    a synctime array that includes synctime values of at least some events in an individual data batch, and
    an othertime array that includes othertime values that indicate known future times that individual ones of the events in the individual data batch are expected to end; and
based on at least one of the key array, the synctime array, or the othertime array, presenting a result comprising one or more values from the stream of incoming data events in response to the received real-time or near real-time query.

10. The computing system of claim 9, the acts further comprising adding a punctuation to a first event to prompt an output of a partially filled data batch to a downstream operator, wherein the punctuation is further used to indicate when no incoming data is detected over a period of time.

11. The computing system of claim 9, wherein:
the individual data batches store control parameters in individual arrays;
particular ones of the individual data batches store a corresponding array of all associated payloads; and
processing the individual data batches in the sequence includes processing entire uninterrupted arrays without performing per-row encoding or per-row decoding.

12. The computing system of claim 9, wherein:
a particular data batch stores control parameters in individual arrays;
the particular data batch stores an array of all payloads within the particular data batch;
when a particular payload is of a string type, individual strings are stored within the particular data batch end-to-end in a single character array with additional information associated with starts and offsets of the individual strings; and
processing the particular data batch includes:
  performing string operations directly on the single character array; or
  performing string operations includes copying individual strings to a buffer and performing string operations on the buffer.

13. The computing system of claim 9, wherein:
a particular stream is logically grouped by a key that logically represents multiple distinct sub-streams; and
each distinct sub-stream is associated with a distinct value of a grouping key.

14. The computing system of claim 13, wherein a single timestamp domain is associated with all groups such that passage of time occurs across all groups and not on a per-group basis.

15. The computing system of claim 13, wherein a grouping key and a hash value associated with the grouping key are stored as part of a data event.

16. The computing system of claim 9, the acts further comprising:
receiving a query that corresponds to a row-oriented view of data;
in response to receiving the query, dynamically generating custom code corresponding to columnar representation of the data;
incorporating the custom code to generate a custom operator; and
executing the custom operator against the columnar representation of the data to determine query results to be provided in response to the query.

17. The computing system of claim 16, wherein dynamically generating the custom code includes replacing references to a particular field having a particular value with references to a particular row in a column corresponding to the particular field.

18. One or more computer-readable media maintaining instructions that, when executed by one or more processors, cause the one or more processors to perform acts comprising:
receiving a real-time or near real-time query for a stream of incoming data events;'
annotating each individual data event of the stream of the incoming data events with a first timestamp and a second timestamp, wherein:
  the first timestamp identifies when the individual data event is received; and
  the second timestamp identifies additional information associated with the individual data event;
organizing the stream of the incoming data events into a sequence of data batches based at least in part on the first timestamp of each individual data event of the incoming data events, wherein individual data batches include multiple data events, and wherein the individual data batches store:
  a bitvector that includes an occupancy vector representing an array with one bit;
  a key array that includes an array of grouping key values, the grouping key values representing a logic group of a data event; and
  a hash array that includes an array of hash values;
processing the individual data batches in the sequence of data batches in a non-decreasing time order, wherein a logical result of the processing is unaffected by the organizing and wherein an amount of time required to output the logical result is affected by the organizing; and
based on at least one of the key array, the bitvector, or the hash array, presenting a result comprising one or more values from the stream of incoming data events in response to the received real-time or near real-time query.

19. The one or more computer-readable media of claim 18, wherein the individual data batches further store:
a synctime array that includes an array of synctime values of all events in a particular data batch; and
an othertime array that includes an array of othertime values of all events in the particular data batch.

20. The one or more computer-readable media of claim 18, wherein each incoming data event is annotated with only the first timestamp and the second timestamp.

* * * * *